United States Patent
Liu et al.

(10) Patent No.: US 11,689,132 B2
(45) Date of Patent: Jun. 27, 2023

(54) MTPA BASED METHOD FOR PARAMETERLESS AND POSITION-SENSORLESS CONTROL OF A PERMANENT MAGNET SYNCHRONOUS MOTOR

(71) Applicant: Zhongshan Broad-Ocean Motor Co., Ltd., Zhongshan (CN)

(72) Inventors: Ning Liu, Zhongshan (CN); Wei Guo, Zhongshan (CN); Yan Yang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 17/686,391

(22) Filed: Mar. 3, 2022

(65) Prior Publication Data
US 2022/0190762 A1    Jun. 16, 2022

Related U.S. Application Data

(63) Continuation-in-part of application No. PCT/CN2019/114919, filed on Nov. 1, 2019.

(30) Foreign Application Priority Data

Oct. 28, 2019    (CN) .......................... 201911028408.9

(51) Int. Cl.
*H02P 27/08*    (2006.01)
*H02P 21/26*    (2016.01)
(Continued)

(52) U.S. Cl.
CPC .......... *H02P 21/26* (2016.02); *H02P 21/0003* (2013.01); *H02P 21/0089* (2013.01);
(Continued)

(58) Field of Classification Search
CPC .. H02P 21/26; H02P 21/0003; H02P 21/0089; H02P 21/22; H02P 25/024; H02P 27/08; H02M 7/53871
See application file for complete search history.

(56) References Cited

U.S. PATENT DOCUMENTS 8,339,094 B2 * 12/2012 Perisic .............. H02M 7/53871
318/811
8,618,756 B2 * 12/2013 Hung ...................... H02P 21/14
318/400.07
(Continued)

FOREIGN PATENT DOCUMENTS

| CN | 101110559 A | 1/2008 |
| CN | 102594250 A | 7/2012 |

(Continued)

OTHER PUBLICATIONS

Zhenbo Li, et al., Research of Sensorless Air Compressor MTPA Control, Journal of Taiyuan University of Science and Technology, Aug. 2018, pp. 269-275, vol. 39, No. 4, China Academic Journal Electronic Publishing House, China.

*Primary Examiner* — Rina I Duda
(74) *Attorney, Agent, or Firm* — Matthias Scholl P.C.; Matthias Scholl

(57) ABSTRACT

A parameterless and position-sensorless MTPA control of a permanent magnet synchronous motor including: using three rotating reference frames having different observation angles to parse the current vector; using a target current value and a preset current-rotor angle $\gamma$ that is between the current vector and the $q_r$-axis of the $(d_r, q_r)$ rotor reference frame to obtain the angles between the current vector, the voltage vector, and the rotor position; obtaining the target voltage value and the target voltage angle by using the obtained angles to obtain the target phase voltage values for regulation. The method is simple in controlling the motor, (Continued)

improves the control efficiency and reliability, and improves the control accuracy.

6 Claims, 18 Drawing Sheets

(51) Int. Cl.
*H02P 21/22* (2016.01)
*H02P 25/024* (2016.01)
*H02P 21/00* (2016.01)
*H02M 7/5387* (2007.01)

(52) U.S. Cl.
CPC ............ *H02P 21/22* (2016.02); *H02P 25/024* (2016.02); *H02P 27/08* (2013.01); *H02M 7/53871* (2013.01); *H02P 2207/05* (2013.01)

(56) References Cited

U.S. PATENT DOCUMENTS

| | | | | |
|---|---|---|---|---|
| 2013/0169201 A1* | 7/2013 | Kinoshita | ............ | H02P 27/085 318/400.02 |
| 2014/0333241 A1* | 11/2014 | Zhao | ........................ | H02P 27/08 318/400.02 |
| 2016/0056738 A1* | 2/2016 | Kim | ........................ | H02P 21/10 318/400.15 |

FOREIGN PATENT DOCUMENTS

| | | |
|---|---|---|
| CN | 103607155 A | 2/2014 |
| CN | 103929109 A | 7/2014 |
| CN | 109889117 A | 6/2019 |
| CN | 110071674 A | 7/2019 |
| EP | 2544362 A2 | 1/2013 |
| JP | 2003081110 A | 3/2003 |

\* cited by examiner

MTPA BASED METHOD FOR PARAMETERLESS AND POSITION-SENSORLESS CONTROL OF A PERMANENT MAGNET SYNCHRONOUS MOTOR

CROSS-REFERENCE TO RELATED APPLICATIONS

This application is a continuation-in-part of International Patent Application No. PCT/CN2019/114919 with an international filing date of Nov. 1, 2019, designating the United States, now pending, and further claims foreign priority benefits to Chinese Patent Application No. 201911028408.9, filed Oct. 28, 2019. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The invention relates to a maximum torque per ampere (MTPA) based method for a position-sensorless control (which is carried out without a position sensor) of a permanent magnet synchronous motor.

Methods for a position-sensorless control of a permanent magnet synchronous motor typically include a constant-torque control mode, a constant-speed control mode, and a constant-air-volume control mode.

For example, U.S. Pat. No. 7,525,269 discloses an apparatus for a position-sensorless control of a permanent magnet synchronous motor drive system, in which a current-torque control is provided for performing a constant torque control.

Chinese patent publication No. 103929109A discloses a constant speed control method for a position-sensorless control of a permanent magnet synchronous motor.

FIG. 1 shows a block diagram of a conventional constant torque control. Referring to FIG. 1, the torque T is related only to the q-axis current, and thus a preset torque T can be converted to a preset q-axis current iq0 according to the formula T=K×iq0. Then a PI controller with the requisite corrective behavior can be used to perform a closed-loop control of the q-axis current, thus achieving the constant torque control.

The conventional field-oriented control (FOC) methods for a position-sensorless control of a permanent magnet synchronous motor are typically based on the rotor frame. The algorithm for deriving the rotor position in the FOC method highly depends on the accuracy of the motor parameters (e.g., the resistance Rs, the q-axis inductance Lq, the d-axis inductance Ld, and the magnetic flux λm), thus results in a large error due to for example the change in the rotor temperature. Also, the vector control algorithm in the FOC method is complicated, which requires time-consuming computation and large sources in the microcontroller unit (MCU). Therefore, a high-demanded microcontroller unit (MCU) is required to operates the FOC method, making the motor control costly. Moreover, because the FOC method is highly dependent on the accuracy of the motor parameters such as the resistance Rs, the q-axis inductance Lq, the d-axis inductance Ld, and the magnetic flux λm, the motor control based on the FOC method has a relative narrow range of applications.

SUMMARY

In view of the above-described problems, the disclosure provides a MTPA based control method for a parameterless and position-sensorless control of a permanent magnet synchronous motor. The method is operated without a position sensor (i.e., position-sensorless control) and does not depend on the motor parameters such as the resistance Rs, the q-axis inductance Lq, the d-axis inductance Ld, and the magnetic flux λm (i.e., parameterless control); its control algorithm is more uncomplicated and time-saving, and is more cost-saving because it does not require a demanded microcontroller unit (MCU).

To achieve the above objectives, in accordance with one embodiment of the invention, there is provided a MTPA based control method for a parameterless and position-sensorless control of a permanent magnet synchronous motor, the method comprising:

1). calculating a target $d_r$-axis current value $I_{dr}$ and a target $q_r$-axis current value $I_{qr}$ of a target current vector $\vec{Idq}$ in a ($d_r$, $q_r$) rotor reference frame by using a target current value $I_{dq}$ of the current vector $\vec{Idq}$ and a preset current-rotor angle γ; in which the preset current-rotor angle y is measured between the current vector $\vec{Idq}$ and the $q_r$-axis of the ($d_r$, $q_r$) rotor reference frame; the ($d_r$, $q_r$) rotor reference frame is a first (d, q) rotating reference frame that is rotating in synchronism with the rotating magnetic field of the rotor, and the rotor position (i.e., the north polar of the magnetic field of the rotor) is aligned with the $d_r$-axis of the ($d_r$, $q_r$) rotor reference frame; the target current value $I_{dq}$ is input by a user or obtained by using the real-time phase current values $I_a$, $I_b$, and $I_c$ of the real-time current vector $\vec{Iabc}$; and the preset current-rotor angle γ is input by the user;

2). looking up a target voltage-rotor angle α or a target voltage-current angle β through a MTPA look-up table by referring to the target $d_r$-axis current value $I_{dr}$ and the target $q_r$-axis current value $I_{qr}$; in which the target voltage-rotor angle α is an angle between the $d_v$-axis of a ($d_v$, $q_v$) voltage reference frame and the $d_r$-axis of the ($d_r$, $q_r$) rotor reference frame; the ($d_v$, $q_v$) voltage reference frame is a second (d, q) rotating reference frame that is rotating in synchronism with the rotating magnetic field, and a target voltage vector $\vec{Vdq}$ is aligned with the $q_v$-axis of the ($d_v$, $q_v$) voltage reference frame such that a target $d_v$-axis voltage value $V_{dv}$ of the target voltage vector $\vec{Vdq}$ equals to zero and a target $q_v$-axis voltage value $V_{qv}$ of the target voltage vector $\vec{Vdq}$ equals to a target voltage value $V_{dq}$ of the voltage vector $\vec{Vdq}$ (i.e., $V_{dv}=0$ and $V_{qv}=V_{dq}$); the target voltage-current angle β is an angle between the voltage vector $\vec{Vdq}$ and the current vector $\vec{Idq}$; and the MTPA look-up table is obtained in the maximum torque per ampere (MTPA) mode and comprises correspondences between the target dr-axis current value $I_{dr}$, the target $q_r$-axis current value $I_{qr}$, the preset current-rotor angle γ, the target voltage-rotor angle α, and the target voltage-current angle β;

3) calculating a PI error Δ by using the target $d_r$-axis current value $I_{dr}$, the target qr-axis current value $I_{qr}$, the target voltage-rotor angle α, the target voltage-current angle β, and the real-time phase current values $I_a$, $I_b$, and $I_c$; and obtaining the target voltage value $V_{dq}$ of the voltage vector $\overrightarrow{Vdq}$ by regulating the PI error Δ to be zero through a PI controller via the formula $V_{dq}$=PI (Δ);

4) obtaining a target voltage angle $θ_v$ of the target voltage vector $\overrightarrow{Vdq}$, in which the target voltage angle $θ_v$ is an angle between the target voltage vector $\overrightarrow{Vdq}$ and the A-axis of the orthogonal (A, B) stationary reference frame; the A-axis of the orthogonal (A, B) stationary reference frame is aligned with the a-axis of the (a, b, c) stationary reference frame (i.e., the phase-a winding having the real-time phase current Ia); and the target voltage angle $θ_v$ is obtained by using the target dr-axis current value $I_{dr}$, the target $q_r$-axis current value $I_{qr}$, the target voltage-rotor angle α, and the real-time phase current values $I_a$, $I_b$, and $I_c$, or obtained by using a given rotating speed value $S_{pd}$ of the rotor;

5) calculating the target A-axis voltage value $V_A$ and the target B-axis voltage value $V_B$ of the target voltage vector $\overrightarrow{Vdq}$ in the orthogonal (A, B) stationary reference frame by using the target voltage value $V_{dq}$ and the target voltage angle $θ_v$ through the inverse Park transmission; converting the target A-axis voltage value $V_A$ and the target B-axis voltage value $V_B$ into target phase voltage values $V_a$, $V_b$, and $V_c$, and modulating PWM signals of the inverter by using the phase the target voltage values $V_a$, $V_b$, and $V_c$ for regulating the real-time phase current values $I_a$, $I_b$, and $I_c$.

In a class of this embodiment, the method is operated under a current-control mode, in which:
in 1), the target current value $I_{dq}$ is input by a user; and the target dr-axis current value $I_{dr}$ and the target $q_r$-axis current value $I_{qr}$ are calculated via the formulas:

$$I_{dr}=-I_{dq}×\sin(γ), \text{ and}$$

$$I_{qr}=I_{dq}×\cos(γ);$$

in 3), the PI error Δ equals to the target $d_v$-axis current value $I_{dv}$ of the target current vector $\overrightarrow{Idq}$ minus the $d_v$-axis current value $i_{dv\_real}$ of the real-time current vector $\overrightarrow{Iabc}$ in the ($d_v$, $q_v$) voltage reference frame (i.e., Δ=$I_{dv}$−$I_{dr\_real}$); in which the target $d_v$-axis current value $I_{dv}$ and the target $q_v$-axis current value $I_{qv}$ of the target current vector $\overrightarrow{Idq}$ are calculated via the formulas:

$$I_{dv}=I_{dr}*\cos(α)+I_{qr}*\sin(α), \text{ and}$$

$$I_{qv}=-I_{dr}*\sin(α)+I_{qr}*\cos(α);$$

the $d_v$-axis current value $I_{dv\_real}$ and the $q_v$-axis current value $I_{dv\_real}$ of the real-time current vector $\overrightarrow{Iabc}$ are obtained by projecting the real-time current vector $\overrightarrow{Iabc}$ from the orthogonal (A, B) stationary reference frame onto the ($d_v$, $q_v$) voltage reference frame via the Park transmission, by using the formulas:

$$I_{dv\_real}=I_A*\cos(θ_{dv-qv})+I_B*\sin(θ_{dv-qv}), \text{ and}$$

$$I_{qv\_real}=I_B*\cos(θ_{dv-qv})-I_A*\sin(θ_{dv-qv}); θ_{dv-qv} \text{ is the observation angle (i.e., the azimuth angle) for the (}d_v, q_v\text{) voltage reference frame, } θ_{dv-qv} \text{ is an angle between the } d_v\text{-axis of the (}d_v, q_v\text{) voltage reference frame and the A-axis of the orthogonal (A, B) stationary reference frame, and } θ_v=θ_{dv-qv}+90°;$$

$I_A$ and $I_B$ are respectively the A-axis current value and the B-axis current value of the real-time current vector $\overrightarrow{Iabc}$ in the orthogonal (A, B) stationary reference frame, and are converted from the real-time phase current values $I_a$, $I_b$, and $I_c$ of the real-time current vector $\overrightarrow{Iabc}$ in the (a, b, c) stationary reference frame via the Clarke transmission, by using the formulas:

$$I_A = \frac{2}{3}I_a - \frac{1}{3}(I_b + I_c), \text{ and}$$

$$I_B = \frac{2}{\sqrt{3}}(I_b - I_c);$$

in 4), the target voltage angle $θ_v$ is obtained by inputting the target $q_v$-axis current value $I_{qv}$ of the target current vector $\overrightarrow{Idq}$ and the $q_v$-axis current value $I_{qv\_real}$ of the real-time current vector $\overrightarrow{Iabc}$ in the ($d_v$, $q_v$) voltage reference frame into a phase lock loop (PLL) for processing; in which the phase lock loop is carried out via the formulas to decode $θ_v$:

$$I_{qv}=I_{qv\_real},$$

$$I_{qv\_real}=I_B*\cos(θ_{dv-qv})-I_A*\sin(θ_{dv-qv}), \text{ and}$$

$$θ_v=θ_{dv-qv}+90°.$$

In a class of this embodiment, the method is operated under a speed-control mode, in which:
in 1), the target current value $I_{dq}$ is obtained via:

1a) constructing a ($d_i$, $q_i$) current reference frame, in which the ($d_i$, $q_i$) current reference frame is a third (d, q) rotating reference frame that is rotating in synchronism with the rotating magnetic field, and the real-time current vector $\overrightarrow{Iabc}$ is aligned with the $d_i$-axis of a ($d_i$, $q_i$) current reference frame; whereby a current angle $θ_{i\_real}$ of the real-time current vector $\overrightarrow{Iabc}$ in the orthogonal (A, B) stationary reference frame is the same as the observation angle $θ_{di-qi}$ for the ($d_i$, $q_i$) current reference frame (i.e., $θ_{i\_real}=θ_{di-qi}$), and a $q_i$-axis current value $I_{qi\_real}$ of the real-time current vector $\overrightarrow{Iabc}$ is zero; the current angle $θ_{i\_real}$ is an angle between the real-time current vector $\overrightarrow{Iabc}$ and the A-axis of the orthogonal (A, B) stationary reference frame, and the observation angle $θ_{di-qi}$ is an angle between the $d_i$-axis of the ($d_i$, $q_i$) current reference frame and the A-axis of the orthogonal (A, B) stationary reference frame;

1b) obtaining the $d_i$-axis current value $I_{di\_real}$ and the $q_i$-axis current value $I_{qi\_real}$ of the real-time current vector $\overrightarrow{Iabc}$ in the ($d_i$, $q_i$) current reference frame by projecting the real-time current vector $\overrightarrow{Iabc}$ in the orthogonal (A, B) stationary reference frame onto the ($d_i$, $q_i$) current reference frame via the Park transmission, by using the formulas:

$$I_{di\_real}=I_A*\cos(θ_{i\_real})+I_B*\sin(θ_{i\_real}), \text{ and}$$

$$I_{qi\_real}=I_B*\cos(θ_{i\_real})-I_A*\sin(θ_{i\_real});$$

obtaining the current angle $θ_{i\_real}$ for the real-time current vector $\overrightarrow{Iabc}$ by inputting the $q_i$-axis current value $I_{qi\_real}$ and a zero into a phase lock loop (PLL); wherein the phase lock loop decodes $θ_{i\_real}$ via the formula $$I_{qi\_real}=I_B*\cos(θ_{i\_real})-I_A*\sin(θ_{i\_real})=0; \text{ and}$$

1c) calculating the $d_r$-axis current value $I_{di\_real}$ by using the current angle $\theta_{i\_real}$, and using the $d_r$-axis current value $I_{di\_real}$ as the target current value $I_{dq}$ of a target current vector $\vec{Idq}$ through $I_{dq}=I_{di\_real}$.

in 3), the PI error Δ equals to a real-time voltage-current angle $\theta_{iv}$ minus the target voltage-current angle β (i.e., $\Delta=\theta_{iv}-\beta$); wherein the real-time voltage-current angle $\theta_{iv}$ equals to the target voltage angle $\theta_v$ of the target voltage vector $\vec{Vdq}$ minus the current angle $\theta_{i\_real}$ of the real-time current vector $\vec{Iabc}$ (i.e., $\theta_{iv}=\theta_v-\theta_{i\_real}$); and in 4), the target voltage angle $\theta_v$ is calculated by using a rotating speed value Spd of the motor that is input by a user through the formula $\theta_v=\int s_{pd}\times(\text{pole\_pair}\times 360\times\Delta t\div 60)\cdot dt$; in which pole pair is the number of the magnetic rotor poles, and Δt is the time variable.

In a class of this embodiment, in 2) the MTPA look-up table is obtained through experiments, theoretical calculations, or computer-aided finite-element-analysis software.

In a class of this embodiment, when the target voltage value $V_{dq}$ (i.e., qv-axis voltage value $V_{qv}$) of the target voltage vector $\vec{Vdq}$ is larger than or equal to the preset threshold Vmax, the PI controller is operated at a saturated state and the output voltage of the PI controller is limited to be the preset threshold Vmax, the $d_v$-axis current value $I_{dv}$ of the target current vector $\vec{Idq}$ is not useful for control, and the method is turns into a field-weakening control.

The benefits of the invention include:

1) The control method derives the rotor position without using a magnetic flux observer, thus requiring less CPU time to do the calculation, and being more intuitive and simpler to the position-sensorless control of the motor. The current-control mode and the speed-control mode of the disclosure are operated by two decoupled PI-controllers, achieving better control stability and dynamic response than the multi-stage nested control circuits.

2) In the current-control mode and the speed-control mode of the disclosure, the method regulates the current along the MTPA trajectory that can be calibrated to optimize the motor, and the motor is fully functional and allows starts with a full load. And the method of the invention is carried out over the full operating range from BEMF-free to field-weakening control.

3) The model used in the method of the invention is named a PLSL-MTPA mathematical model. The model does not rely on a single rotor reference frame, it converts the current vector of the motor to a current reference frame and a voltage reference frame, and parses the angles between the voltage vector, the current vector, and the rotor position, for performing the position-sensorless control. The mathematical model and the relative algorithms and calculations are simple in the method, which take less space on the chips, have low requirement for MCU, and make the motor more costly to control.

4) The PLSL-MTPA mathematical model used in the disclosure is an optimized position-sensorless control technology that is not dependent on the motor parameters. The technology solves the conventional bottleneck problem that the position-sensorless control of the motor is highly dependent on the motor parameters such as the resistance Rs, the q-axis inductance Lq, the d-axis inductance Ld, and the magnetic flux λm, such that the mathematical model has a relative wider range of applications.

DETAILED DESCRIPTION OF THE EMBODIMENTS

Detailed description of the invention will be given below in conjunction with the drawings.

Figure 1:
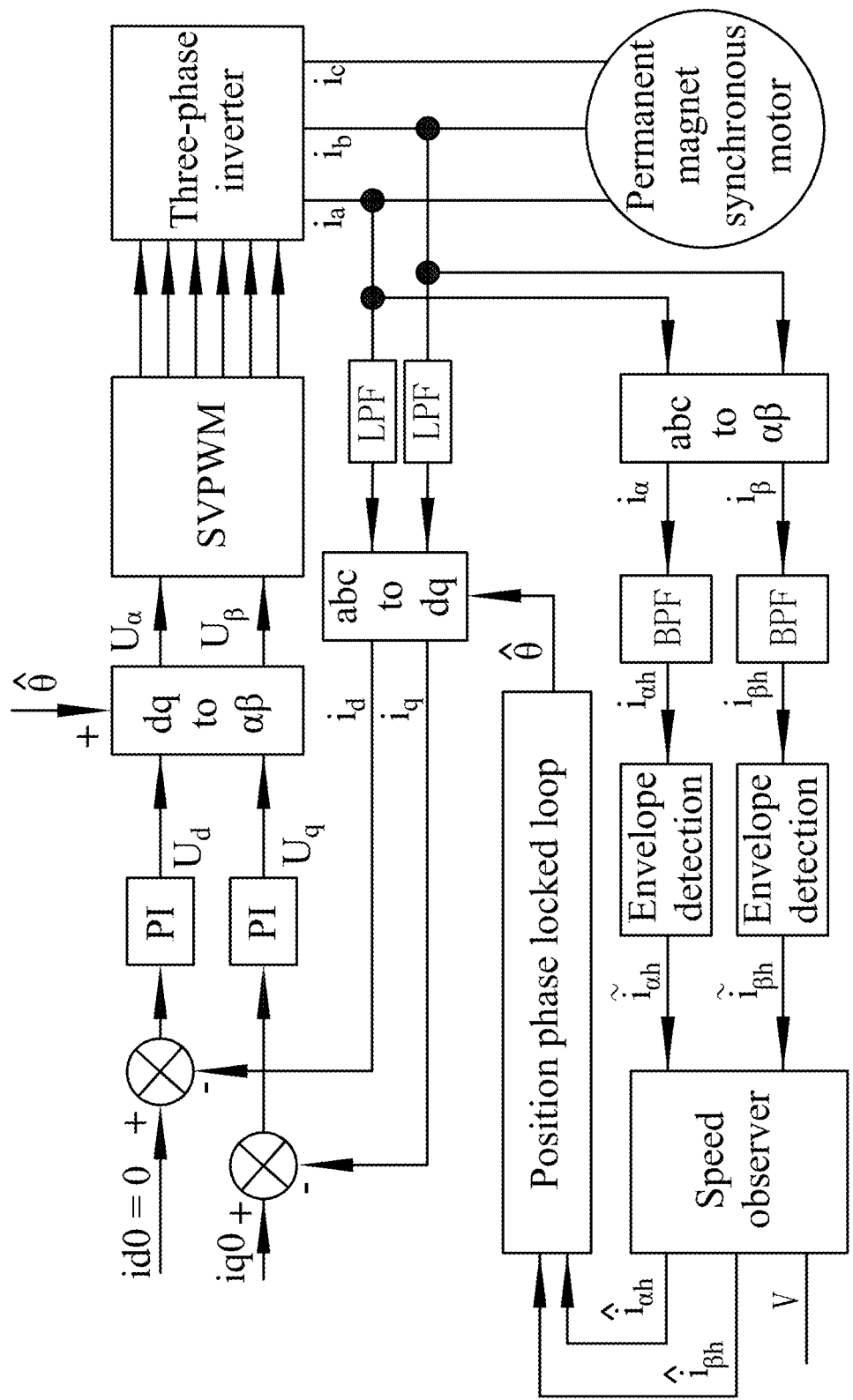
FIG. 1 is a block diagram of a conventional position-sensorless FOC method for controlling a permanent magnet synchronous motor.
Figure 2:
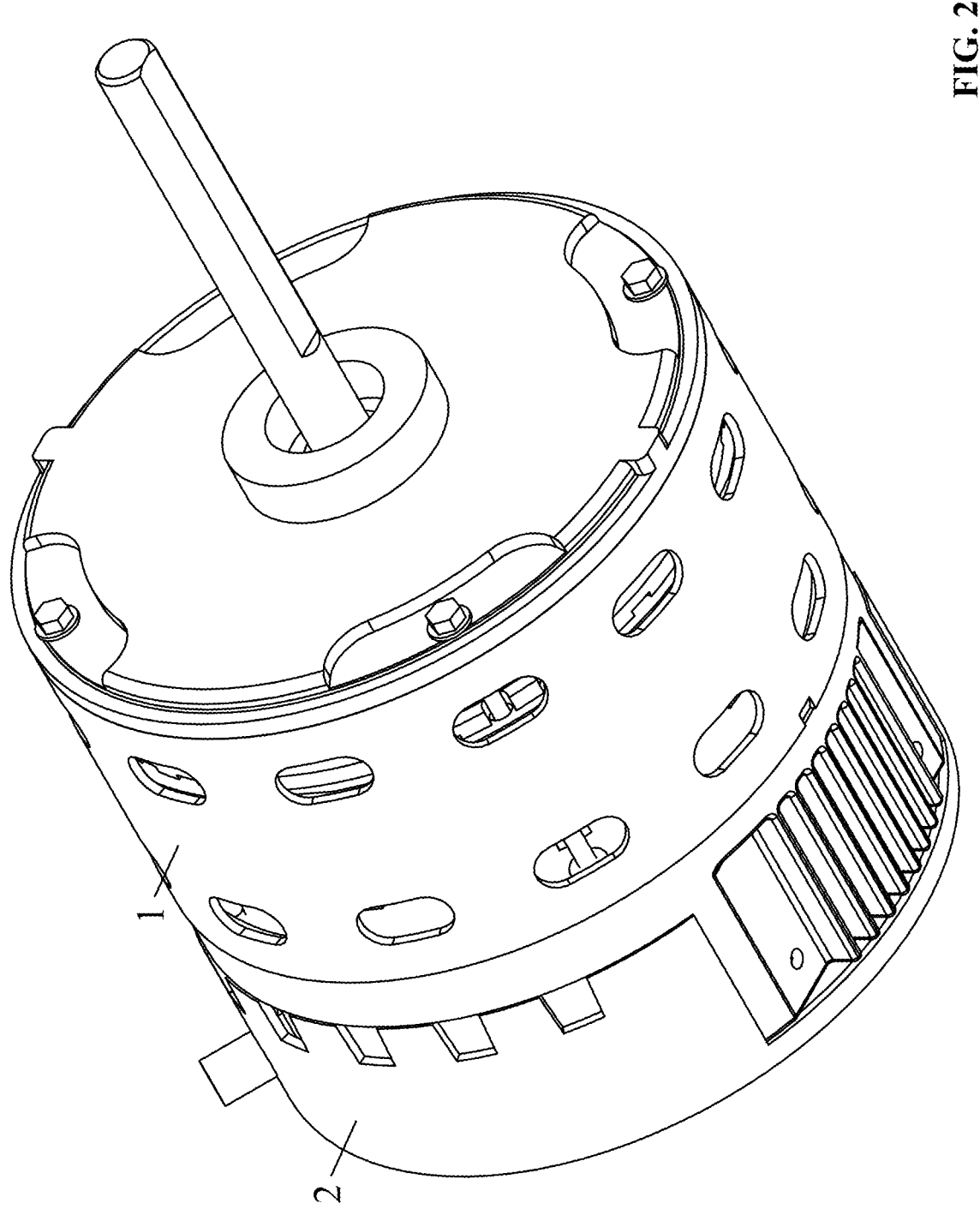
FIG. 2 is a perspective view of a permanent magnet synchronous motor, in accordance with one embodiment of the invention.
Figure 3:
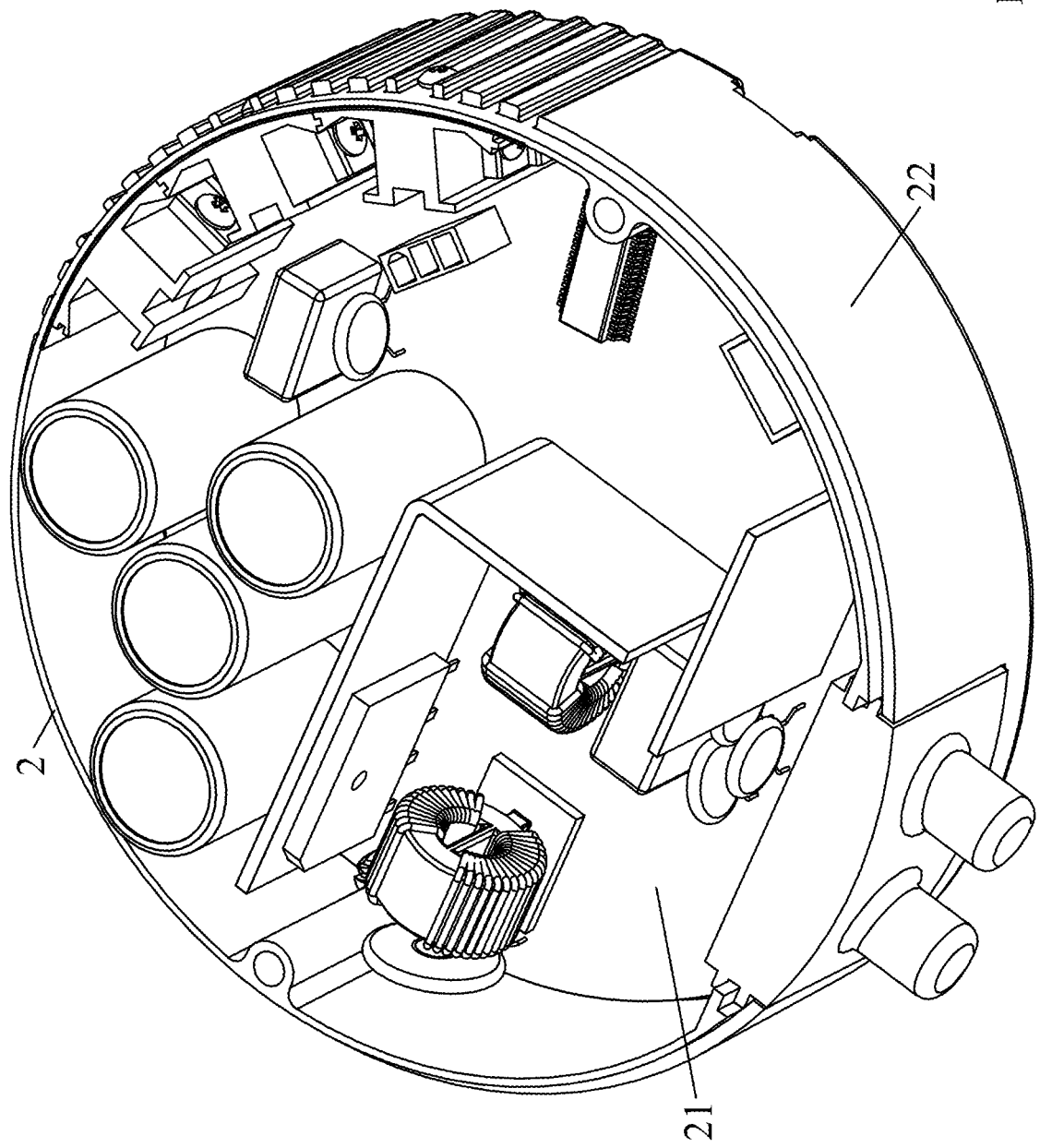
FIG. 3 is a perspective view of a motor controller of a permanent magnet synchronous motor, in accordance with one embodiment of the invention.
Figure 4:
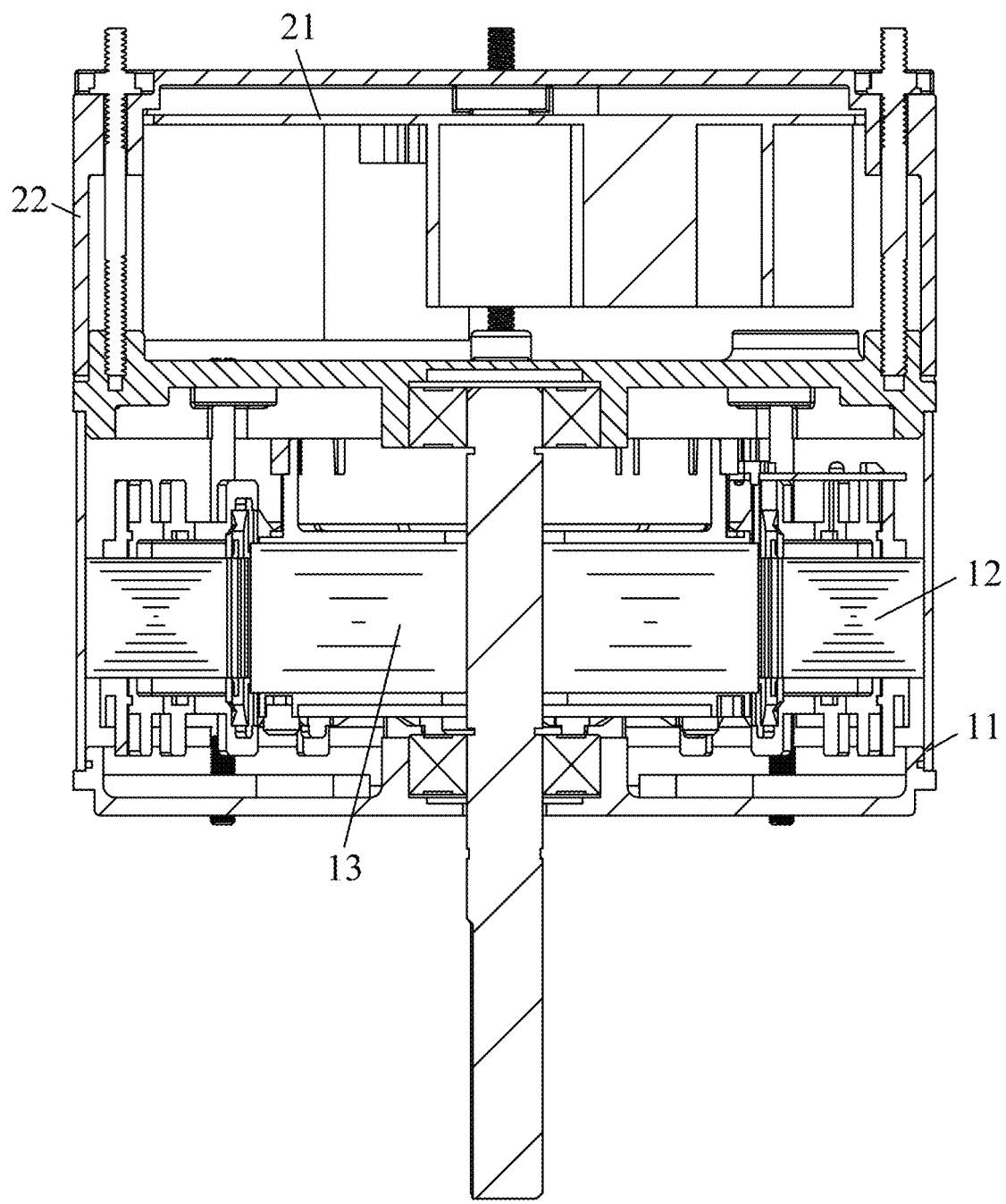
FIG. 4 is a sectional view of a permanent magnet synchronous motor, in accordance with one embodiment of the invention.

Referring to FIGS. 2-4, the invention is used for controlling a three-phase permanent magnet synchronous motor that comprises a motor unit 1 and a motor controller 2. The motor unit 1 comprises a stator assembly 12, a rotor assembly 13 and a housing assembly 11. The stator assembly 12 is mounted on the housing assembly 11; the rotor assembly 13 is mounted within or outside the stator assembly 12; the motor controller 2 comprises a controller housing 22, and a control circuit board 21 mounted in the controller housing 22; the control circuit board 21 typically comprises a power supply circuit, a microprocessor, a bus voltage detection circuit, and an inverter; the power supply circuit supplies power to each part of the circuit. The DC bus voltage $V_{DC\text{-}bus}$ is applied from the bus voltage detection circuit to the microprocessor; the microprocessor controls the inverter to turn on/off the currents to the phase windings of the stator assembly 12.

Figure 5:
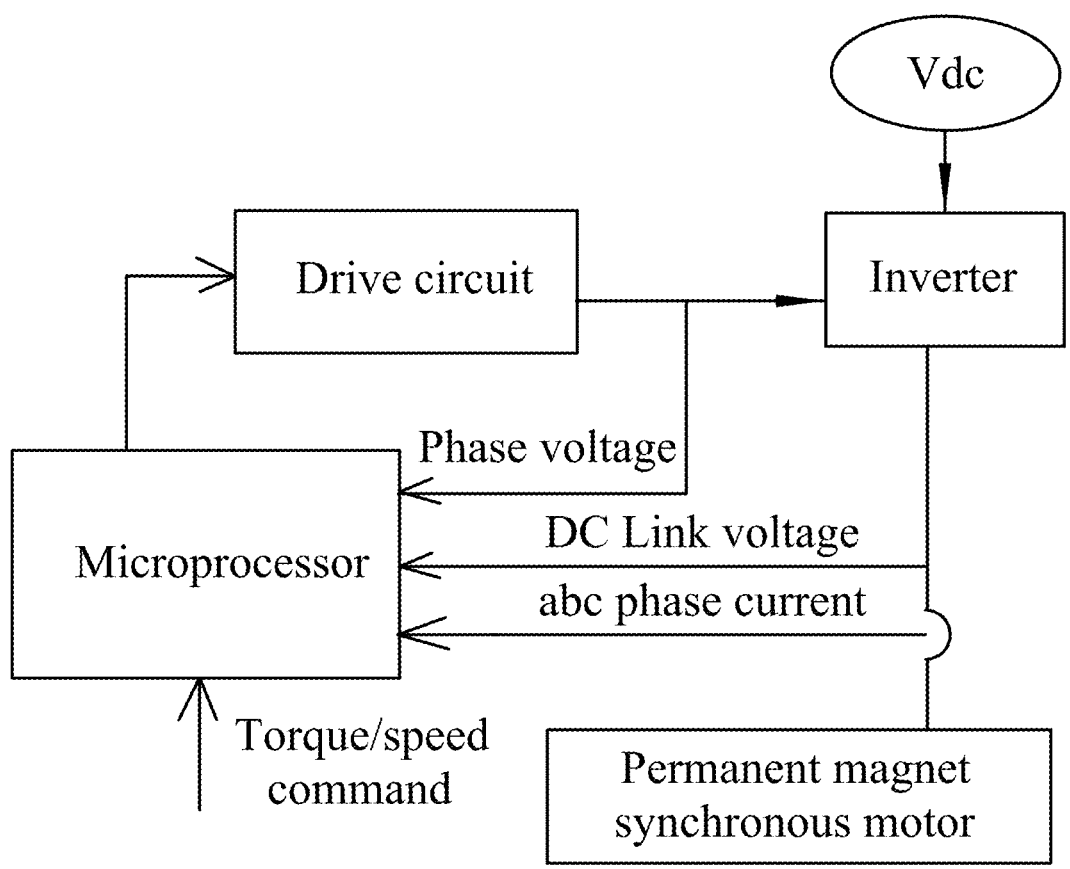
FIG. 5 is a diagram of a control logic in a motor controller of a permanent magnet synchronous motor, in accordance with one embodiment of the invention.
Figure 6:
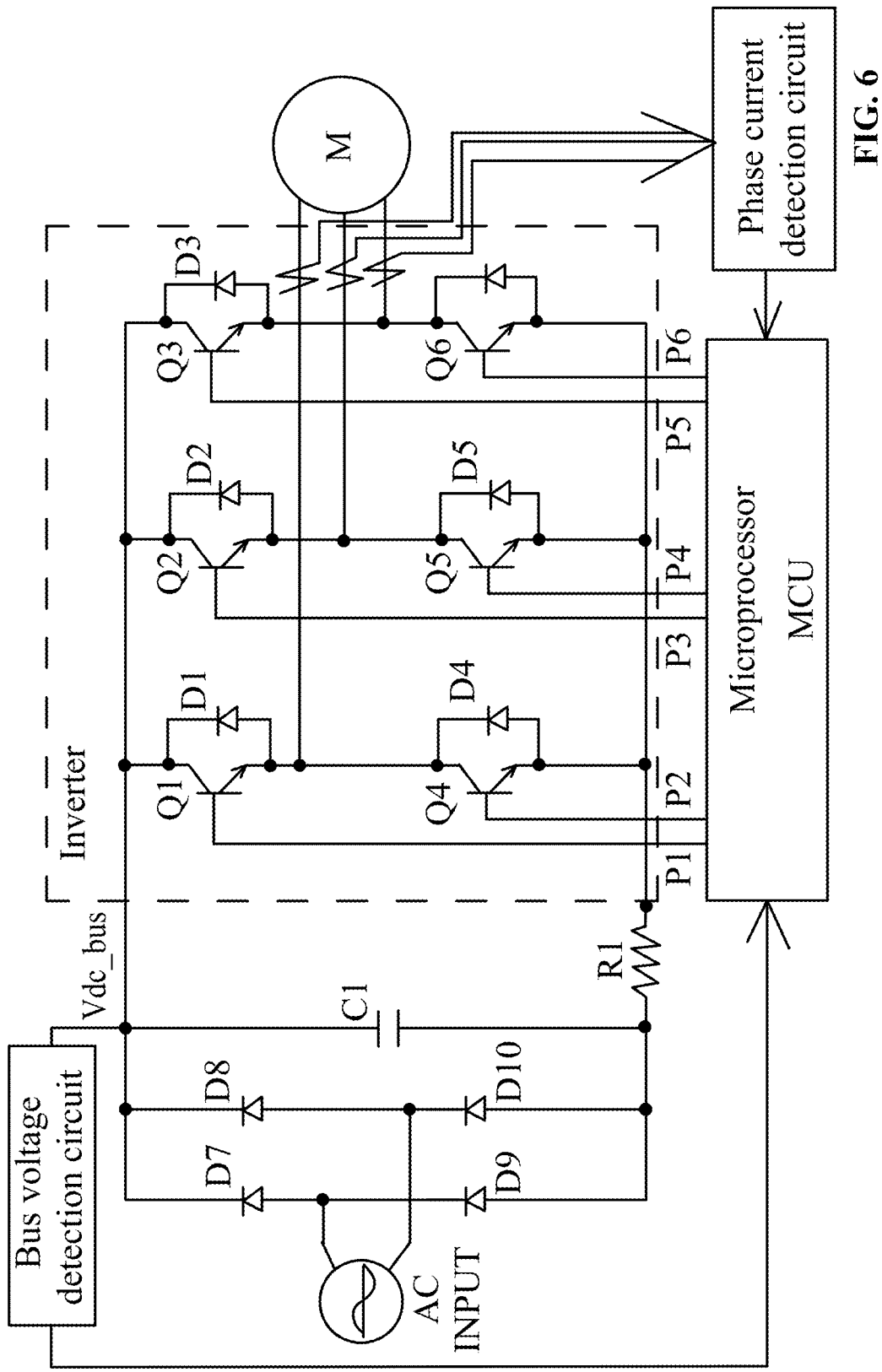
FIG. 6 is a circuit diagram corresponding to FIG. 5.

Referring to FIGS. 5 and 6, a three-phase permanent magnet brushless DC motor inputs the phase currents Ia, Ib, and Ic through the phase current detection circuit to the microprocessor. An alternating-current input (AC input) flows through a full-wave rectification circuit comprising four diodes D7, D8, D9, and D10, and a DC bus voltage $V_{dc\_bus}$ is output at one end of a capacitor C1, wherein the DC bus voltage $V_{dc\_bus}$ is related to the AC-input voltage. The microprocessor inputs pulse-width modulation (PWM) signals to the inverter comprising six electronic switching tubes Q1, Q2, Q3, Q4, Q5, Q6, and the six control ends of the electronic switching tubes are separately controlled by six PWM signals (P1, P2, P3, P4, P5, P6) transmitted from the microprocessor.

Figure 7:
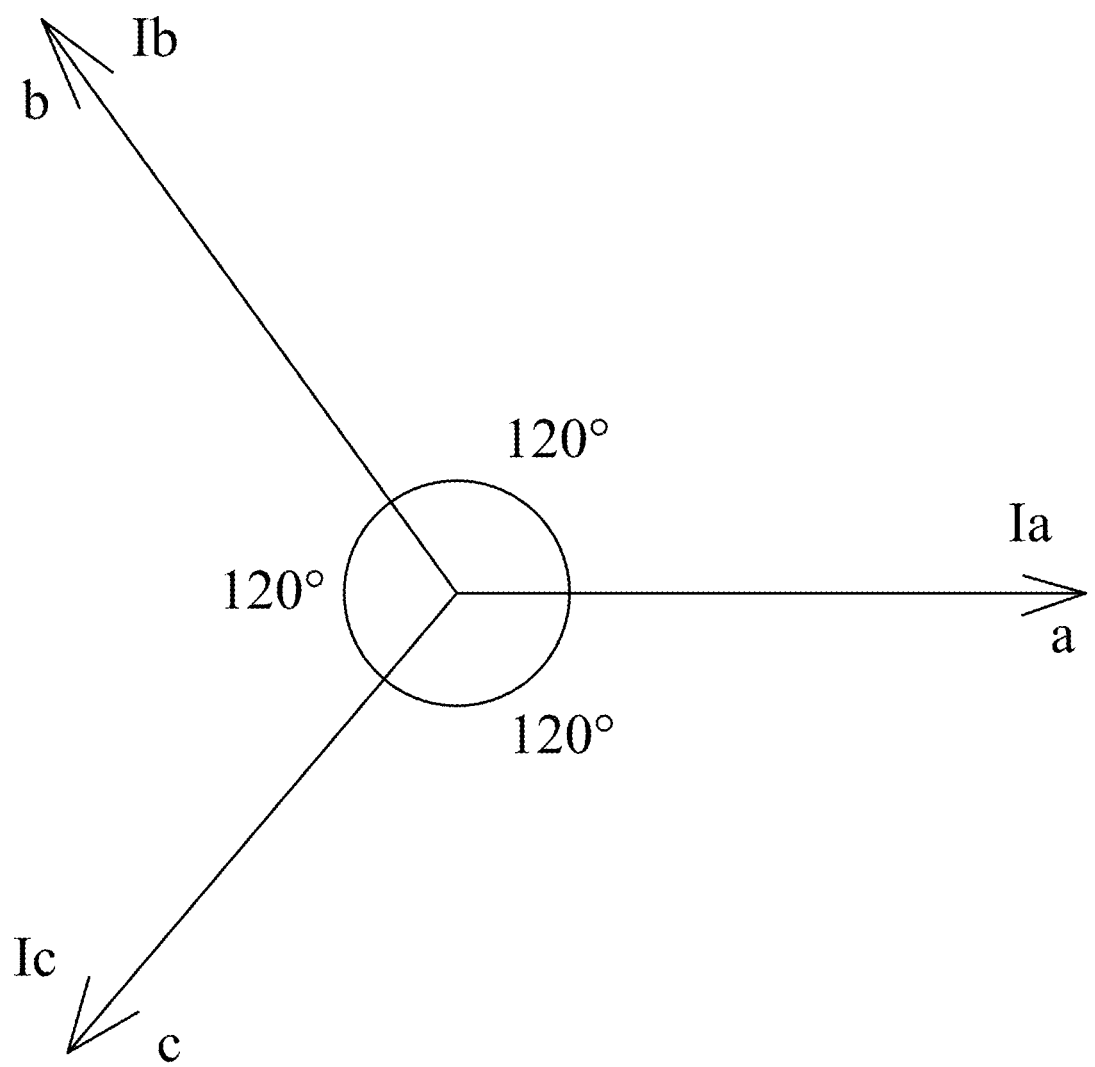
FIG. 7 is a schematic diagram of a (a, b, c) stationary reference frame for a three-phase permanent magnet synchronous motor, in accordance with one embodiment of the invention.
Figure 8:
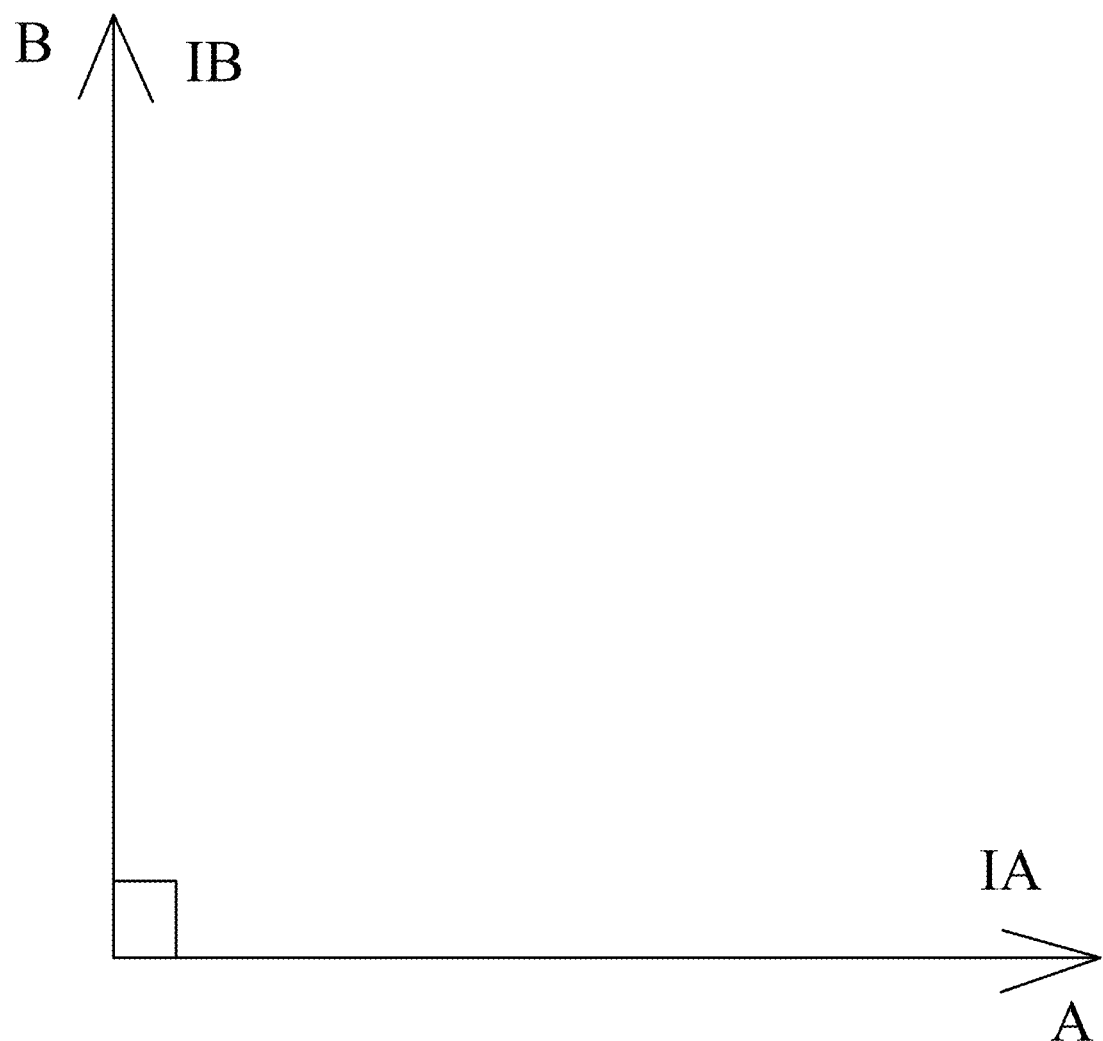
FIG. 8 is a schematic diagram of an orthogonal (A, B) stationary reference frame for a three-phase permanent magnet synchronous motor, in accordance with one embodiment of the invention.
Figure 9:
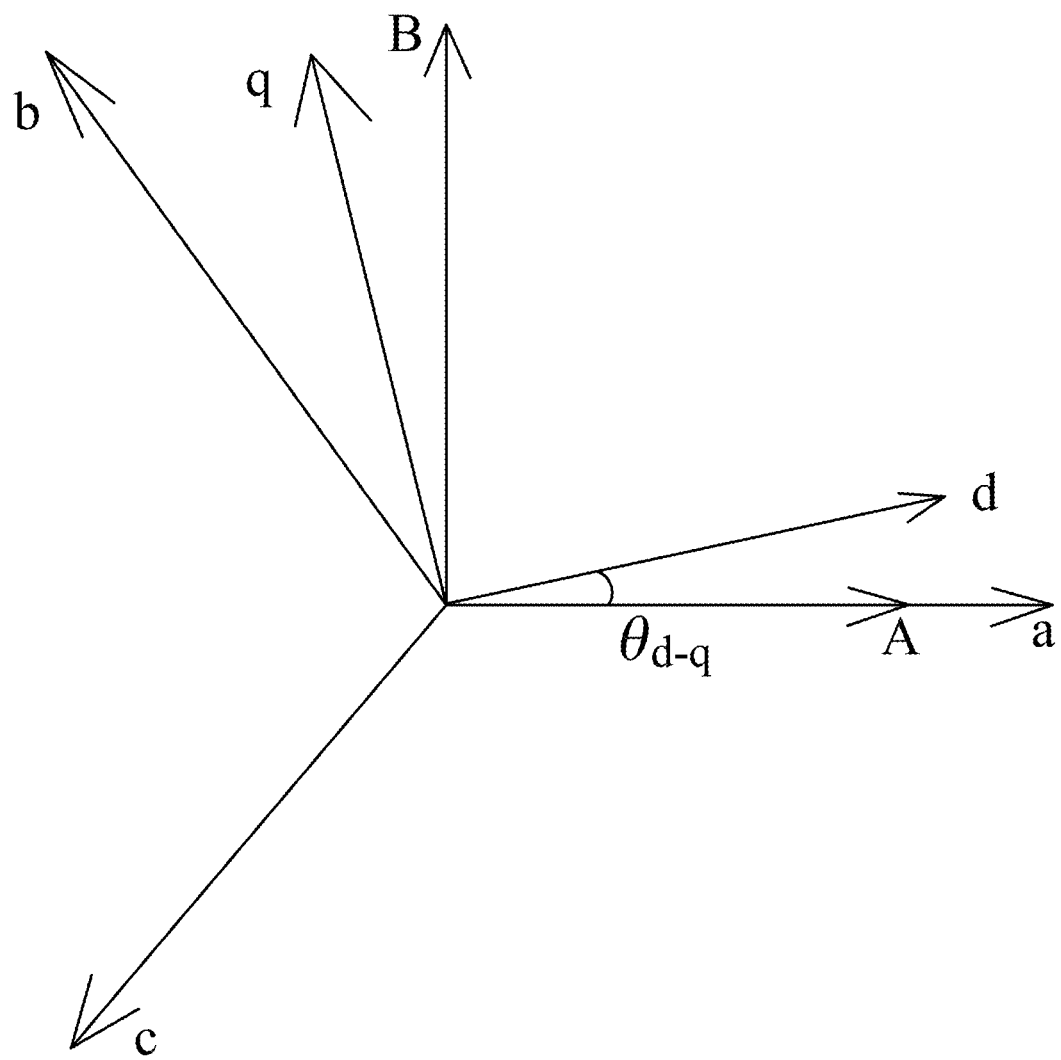
FIG. 9 shows a relationship between a (a, b, c) stationary reference frame, an orthogonal (A, B) stationary reference frame, and a (d, q) rotating reference frame for a vector control of a three-phase permanent magnet synchronous motor, in accordance with one embodiment of the invention.

Referring to FIG. 7, the phase currents of phase-a winding, phase-b winding, and the phase-c winding in the motor are labeled as Ia, Ib and Ic, respectively, with a phase difference of 120 degrees between the two adjacent windings in the time domain, and a reference frame formed by respectively aligning an axis a, an axis b, and an axis c along the phase-a current Ia, the phase-b current Ib, the phase-c current Ic, is called a (a, b, c) stationary reference frame. Referring to FIG. 8, the three time-domain current quantities Ia, Ib and Ic, can be simplified into two currents $I_A$ and $I_B$ in an orthogonal (A, B) stationary reference frame. FIG. 9 is a relationship between a (a, b, c) stationary reference frame, an orthogonal (A, B) stationary reference frame, and a (d, q) rotating reference frame for a vector control of the invention. The mathematical relationships between the currents Ia, Ib, Ic in the (a, b, c) stationary reference frame and the currents $I_A$ and $I_B$ in the orthogonal (A, B) stationary reference frame of the same current vector, are as follows:

$$I_A = \frac{2}{3}I_a - \frac{1}{3}(I_b + I_c), \text{ and} \quad (1)$$

$$I_B = \frac{2}{\sqrt{3}}(I_b - I_c);$$

The above mathematical transformation in the formulas (1) is the so-called Clarke Transformation, where IA and IB are two sinusoidal currents that change with time. When IA and IB are observed on a (d, q) rotating reference frame having the same angular frequency as the sinusoidal currents $I_A$ and $I_B$, the sinusoidal characteristics are eliminated from the current values and only the phase characteristics are retained in the current values. The sinusoidal current values $I_A$ and $I_B$ of a current vector in the orthogonal (A, B) stationary reference frame are converted to the direct-current (DC) d-axis and q-axis current values $I_d$ and $I_q$ in a (d, q) rotating reference frame by performing the Park Transformation through the formulas:

$$I_d = I_A * \cos(\theta_{d-q}) + I_B * \sin(\theta_{d-q}), \text{ and}$$

$$I_q = I_B * \cos(\theta_{d-q}) - I_A * \sin(\theta_{d-q}). \quad (2)$$

Figure 10:
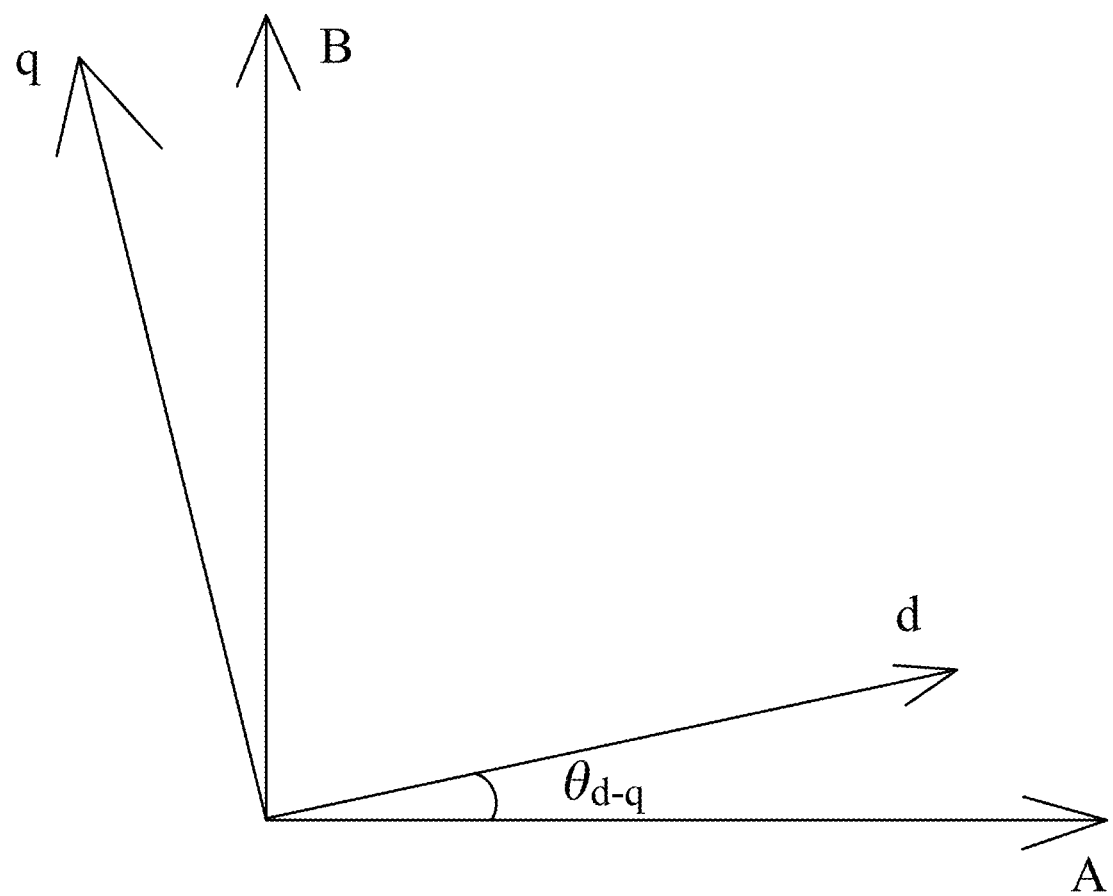
FIG. 10 shows a relationship between an orthogonal (A, B) stationary reference frame and a (d, q) rotating reference frame, in accordance with one embodiment of the invention.

Referring to FIG. 10, the variable $\theta_{d-q}$ in the PARK transformation of the formulas (2) is the angle between the d-axis of the (d, q) rotating reference frame and the A-axis of the orthogonal (A, B) stationary reference frame, and is called the azimuth angle or observation angle for the (d, q) rotating reference frame. When observing the current values $I_A$ and $I_B$ in different (d, q) rotating reference frames having different azimuth angles $\theta_{d-q}$, the current values $I_A$ and $I_B$ are projected onto the different (d, q) rotating reference frames to obtain different current values $I_d$ and $I_q$. When a (d, q) rotating reference frame having an observation angle $\theta_{d-q}$ is selected for performing the Park transformation, the sinusoidal current values $I_A$ and $I_B$ are converted to the DC current values Id and Iq. Other sinusoidal A-axis and B-axis variable quantities (e.g., the voltage values of a voltage vector) in the orthogonal (A, B) stationary reference frame can also be converted to direct-current d-axis and q-axis variable quantities in a (d, q) rotating reference frame by using Park transformation through the formulas in (2), is the observation angle $\theta_{d-q}$ of the (d, q) rotating reference frame is given. In the position-sensorless control of a permanent magnet synchronous motor, the engineers are faced with an important problem of how to select a suitable observation angle $\theta_{d-q}$ for converting the sinusoidal A-axis and B-axis variable quantities (e.g., the current values of a current vector, and the voltage values of a voltage vector) in the orthogonal (A, B) stationary reference frame to the direct-current d-axis and q-axis variable quantities in a (d, q) rotating reference frame, for the purpose of convenient control of the current and voltage vectors of the motor. In a conventional motor control method, the rotor position that refers to the north polar of the magnetic field of the rotor is originated at 0 degree, and the rotor goes through a full circle is defined as a 360° of rotation. The relationship between the rotor position and the number of the magnetic rotor poles is $\theta r = \text{Pole\_pair} \times \theta_0$, in which $\theta r$ is the rotor angle representing the angle of the rotor position in the orthogonal (A, B) stationary reference frame with respect to the A-axis of the orthogonal (A, B) stationary reference frame, and is measured between the rotor position and the A-axis of the orthogonal (A, B) stationary reference frame; $\theta_0$ is the mechanical angle of the rotor; and pole_pair is the number of the magnetic rotor poles.

In most position-sensorless control of the permanent magnet synchronous motors, the mechanical angle $\theta_0$ of the rotor is unknown, the task of the control algorithm is to estimate the angle $\theta r$ that is the key element to execute the control algorithm of the motor. But the conventional FOC method to estimate $\theta r$ used in the control is highly dependent on the motor parameters, thus its control algorithm and mathematical model are complicated, which requires time-consuming computation.

The disclosure provides a MTPA based method for parameterless and position-sensorless control of a permanent magnet synchronous motor, which is named a parameterless sensorless MTPA (PLSL-MTPA) method. It is important to note that the sinusoidal quantities are parsed by establishing different (d, q) rotating reference frames having different observation angles. In particular, the current vector and the voltage vectors are projected onto a $(d_r, q_r)$ rotor reference frame, a ($d_v$, $q_v$) voltage reference frame, and a ($d_i$, $q_i$) current reference frame which all are (d, q) rotating reference frames having different observation angles $\theta_{d-q}$. In particular, the rotor position is aligned with the $d_r$-axis of the ($d_r$, $q_r$) rotor reference frame such that the rotor angle $\theta_r$ equals to the observation angles $\theta_{dr-qr}$ of the ($d_r$, $q_r$) rotor reference frame. The voltage vector $\overrightarrow{Vdq}$ is aligned with the $q_v$-axis of the ($d_v$, $q_v$) voltage reference frame, such that the voltage angle $\theta_v$ equals to the observation angles $\theta_{dv-qv}$ of the ($d_v$, $q_v$) voltage reference frame plus 90° (i.e., $\theta_v = \theta_{dv-qv} + 90°$); the $d_v$-axis value $V_{dv}$ of the voltage vector $\overrightarrow{Vdq}$ is zero (i.e., $V_{dv}=0$); and $q_v$-axis value $V_{qv}$ of the voltage vector $\overrightarrow{Vdq}$ equals to the voltage value $V_{dq}$ of the voltage vector $\overrightarrow{Vdq}$ (i.e., $V_{qv}=V_{dq}$). The current vector $\overrightarrow{Idq}$ is aligned with the $d_i$-axis of the ($d_i$, $q_i$) current reference frame, such that the current angle $\theta_i$ is the same as the observation angles $\theta_{di-qi}$ of the ($d_i$, $q_i$) current reference frame (i.e., $\theta_i=\theta_{di-qi}$); the $q_i$-axis value $I_{qi}$ of the current vector $\overrightarrow{Idq}$ is zero (i.e., $I_{qi}=0$); and $d_i$-axis value $I_{di}$ of the current vector $\overrightarrow{Idq}$ equals to the current value $I_{dq}$ of the current vector $\overrightarrow{Idq}$ (i.e., $I_{di}=I_{dq}$).

Figure 12:
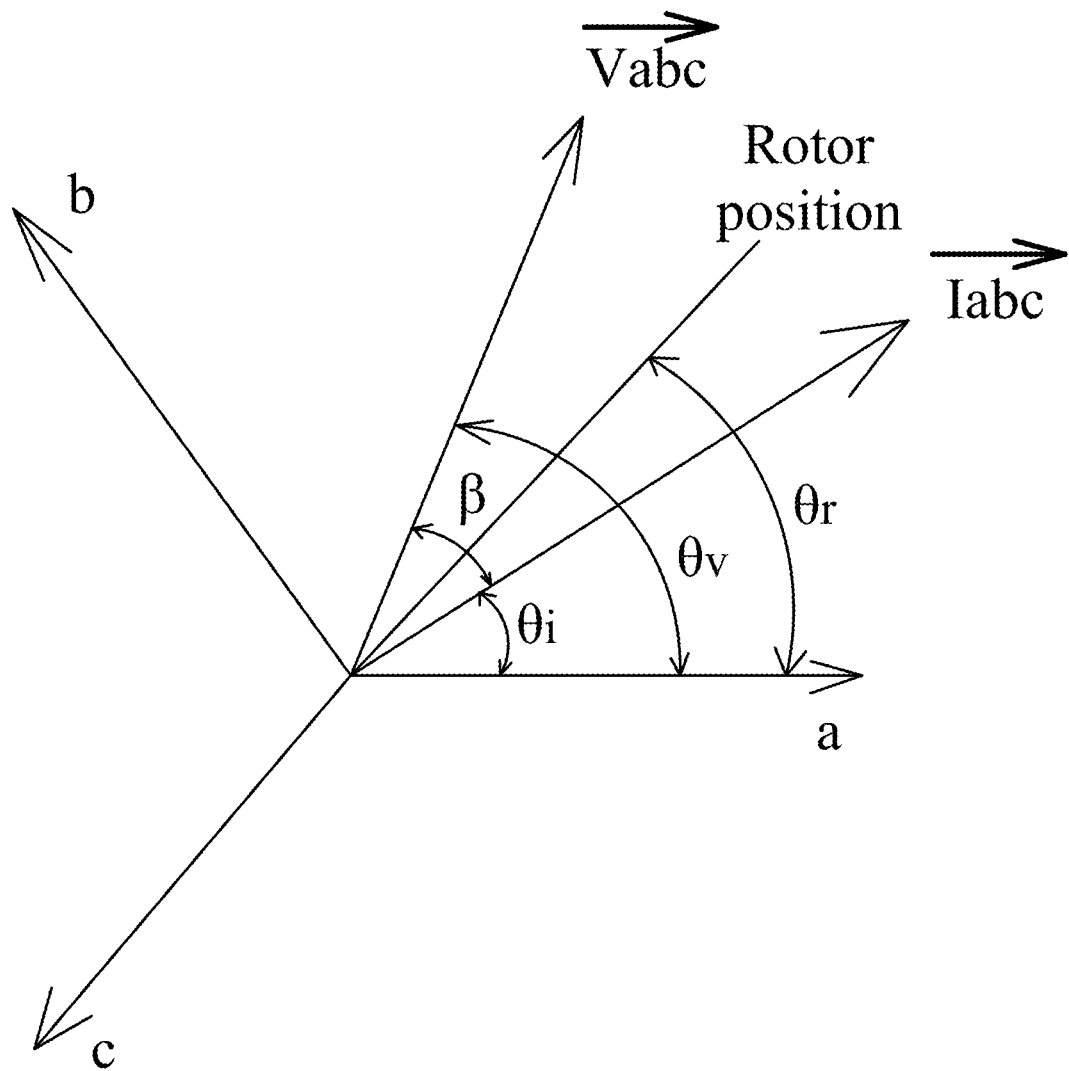
FIG. 12 shows a voltage vector $\vec{Vabc}$, a current vector $\vec{Iabc}$, and a rotor position in a (a, b, c) stationary reference frame, in accordance with one embodiment of the invention.

With reference to FIG. 12, the voltage angle $\theta_v$ represents the angle of the voltage vector $\overrightarrow{Vdq}$ in the orthogonal (A, B) stationary reference frame with respect to the A-axis of the orthogonal (A, B) stationary reference frame, and is measured between the voltage vector $\overrightarrow{Vdq}$ and the A-axis of the orthogonal (A, B) stationary reference frame. The current angle θi represents the angle of the current vector $\overrightarrow{Idq}$ in the orthogonal (A, B) stationary reference frame with respect to the A-axis of the orthogonal (A, B) stationary reference frame, and is measured between the current vector $\overrightarrow{Idq}$ and the A-axis of the orthogonal (A, B) stationary reference frame.

In this invention, the current and voltage vectors are parsed in a ($d_v$, $q_v$) voltage reference frame and a ($d_i$, $q_i$) current reference frame as claimed through the Park transformation, and a phase lock loop (PLL) is introduced to decode the observation angle $\theta_{dv-qv}$ of the ($d_v$, $q_v$) voltage reference frame or the observation angle $\theta_{di-qi}$ of the ($d_i$, $q_i$) current reference frame so as to arrive at the voltage angle $\theta_v$ or the current angle $\theta_i$. The working principle of a phase lock loop is opposite to that of the Park Transformation. Particularly, the Park Transformation converts the sinusoidal variable quantities into the DC (direct-current) variable quantities by using the observation angle $\theta_{d-q}$ of a (d, q) rotating reference frame, while the phase lock loop decodes the observation angle $\theta_{d-q}$ of a (d, q) rotating reference frame by locking one DC variable quantity on an axis of the (d, q) rotating reference frame.

In the speed control mode of the method, the voltage angle $\theta_v$ is obtained by integrating the open-loop speed $S_{pd}$ for calculating the A-axis and B-axis voltage value $V_A$ and $V_B$ in the orthogonal (A, B) stationary reference frame and the phase voltage values $V_a$, $V_b$ and $V_c$ in the (a, b, c) stationary reference frame. The phase lock loop outputs the current angle $\theta_{i\_real}$ of the real-time current vector $\overrightarrow{Iabc}$ that is generated by parsing the A-axis and B-axis current value $I_A$ and $I_B$ of the real-time current vector $\overrightarrow{Iabc}$ in the orthogonal (A, B) stationary reference frame in a ($d_i$, $q_i$) current reference frame by letting the $q_i$-axis current value $I_{qi\_real}$ to be 0. In particular, the current angle $\theta_{i\_real}$ is decoded by using the above formulas (2) to fulfill the relationship ($I_{di\_real}$, 0)=Park transformation ($I_A$, $I_B$) by $\theta_{i\_real}$. In other words, $\theta_{i\_real}$ is decoded in the PLL by fulfilling the relationship: $0=I_B \times \cos(\theta_{i\_real}) - I_A \times \sin(\theta_{i\_real})$. The $d_i$-axis current value $I_{di\_real}$ is the calculated by using the formula $I_{di\_real}=I_A \times \cos(\theta_{i\_real}) + I_B \times \sin(\theta_{i\_real})$ and is used as the target current value $I_{dq}$ of the target current vector $\overrightarrow{Idq}$.

In the synchronous motors, the angles $\theta_v$, $\theta_i$ and $\theta_r$ are three time-domain variables with the same frequency. Taking the phase a for example, supposing the phase-a voltage component Va(t) has a phase lead β with respect to the phase-a current component Ia(t), the phase-a voltage component Va(t) and the phase-a current component Ia(t) are expressed as: $Va(t)=V_{abc} \times \cos(\theta_v)=V_{abc} \times \cos(\omega t+\beta)$ and $Ia(t)=I_{abc} \times \cos(\theta_i)=I_{abc} \times \cos(\omega t)$; in which $V_{abc}$ is the voltage value of a voltage vector $\overrightarrow{Vabc}$ composing the phase voltage components $V_a(t)$, $V_b(t)$, $V_c(t)$ in the (a, b, c) stationary reference frame; $I_{abc}$ is the current value of a current vector $\overrightarrow{Iabc}$ composing the phase current components $I_a(t)$, $I_b(t)$, $I_c(t)$ in the (a, b, c) stationary reference frame; ω is the angular velocity of the rotor; t is the time; and β is the angle between the voltage component Va (t) and the current component Ia (t) of the phase a.

The relationship between the angles $\theta_v$, θi and θr is as follows:

$$\beta = \theta_v - \theta_i \quad (3), \text{ and}$$

$$\theta r = \theta_v - \alpha - 90° \quad (4).$$

Figure 11:
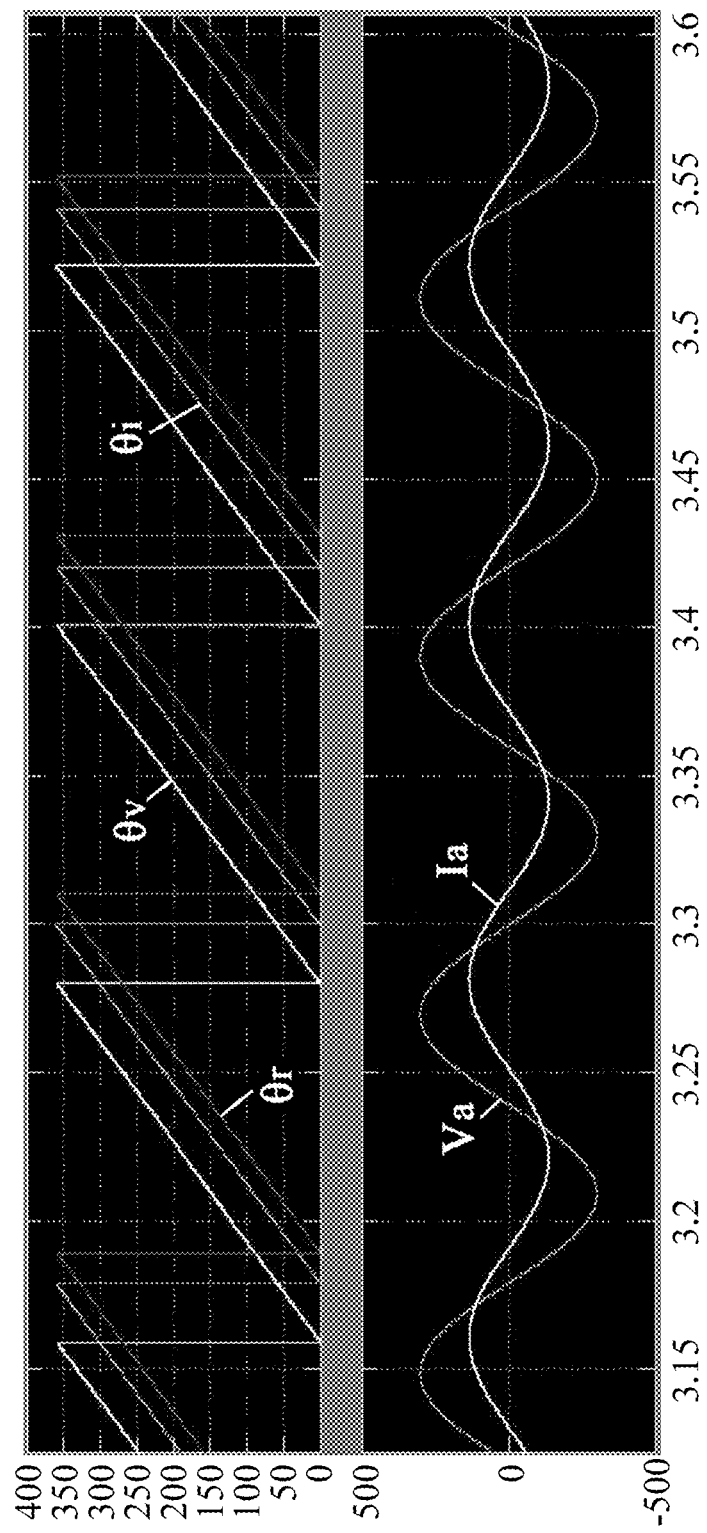
FIG. 11 shows the changes of three angles $\theta_v$, θi and θr having the same frequency along with the phase-a voltage component Va and the phase-a current Ia in a time domain, in accordance with one embodiment of the invention.
Figure 13:
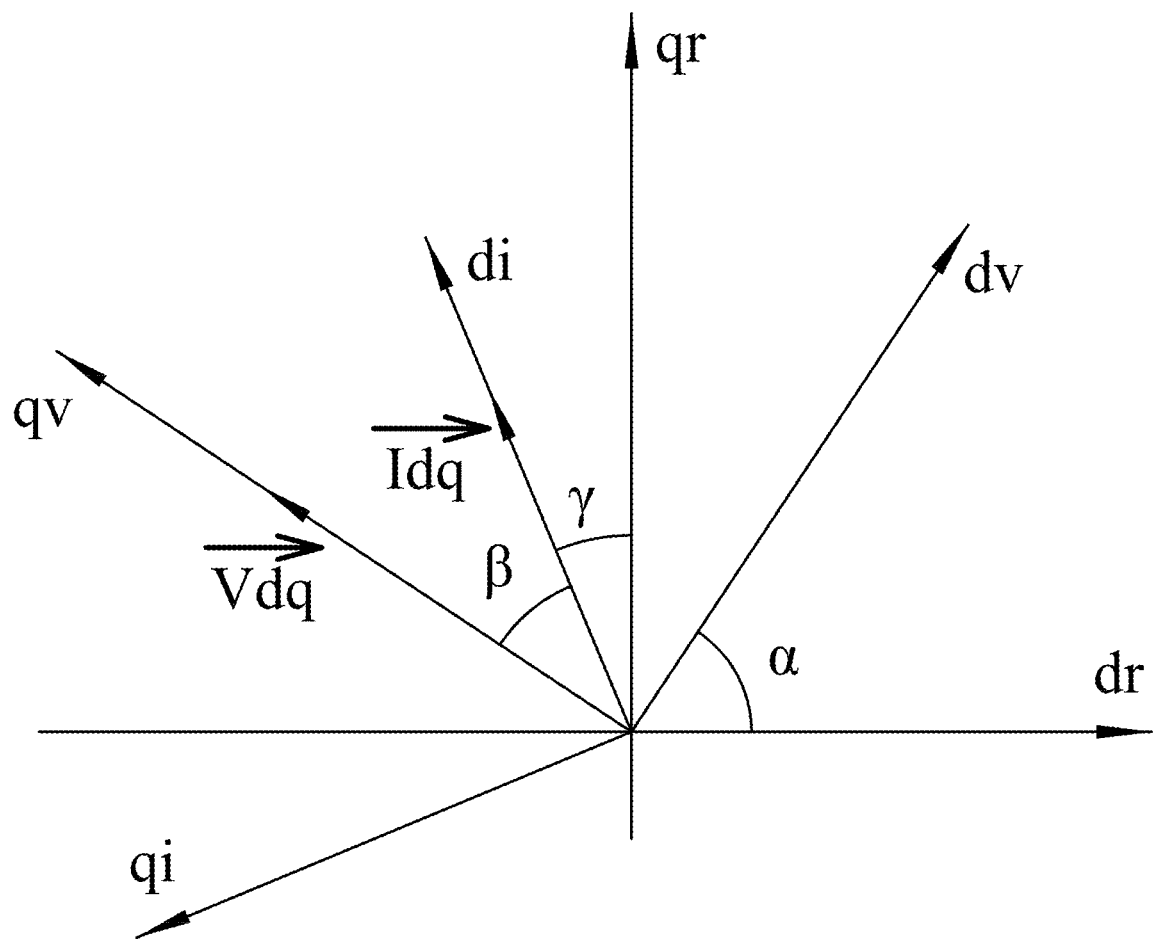
FIG. 13 is a schematic diagram of the control of the voltage vector $\vec{Vdq}$ and the current vector $\vec{Idq}$ in the method, in accordance with one embodiment of the invention.

FIG. 11 shows the changes of three angles $\theta_v$, θi and θr along with the phase-a voltage Va and the phase-a current Ia in a time domain. In one example, the PLSL-MTPA method of the invention control the result of $\theta_v - \theta_i$ to result in a given voltage-current angle β according to the above formula (3), thus forming a speed-control mode. In another example, the PLSL-MTPA method of the invention regulate the projections of the sinusoidal currents $I_A$ and $I_B$ on a ($d_v$, $q_v$) voltage reference frame to result in a given voltage-rotor angle α according to the above formula (4), thus forming a current-control mode. In the PLSL-MTPA method of the invention, the $d_v$-axis voltage value and the $q_v$-axis voltage value of the voltage vector in the ($d_v$, $q_v$) voltage reference frame are controlled as: $V_{dv}=0$ and $V_{qv}=V_{dq}$, and the relationships between the voltage vector, the current vector, and the rotor position are controlled as that in FIG. 13. As shown in FIG. 13, the relation $\alpha=\beta+\gamma$ is obtained in the method of the invention.

Figure 14:
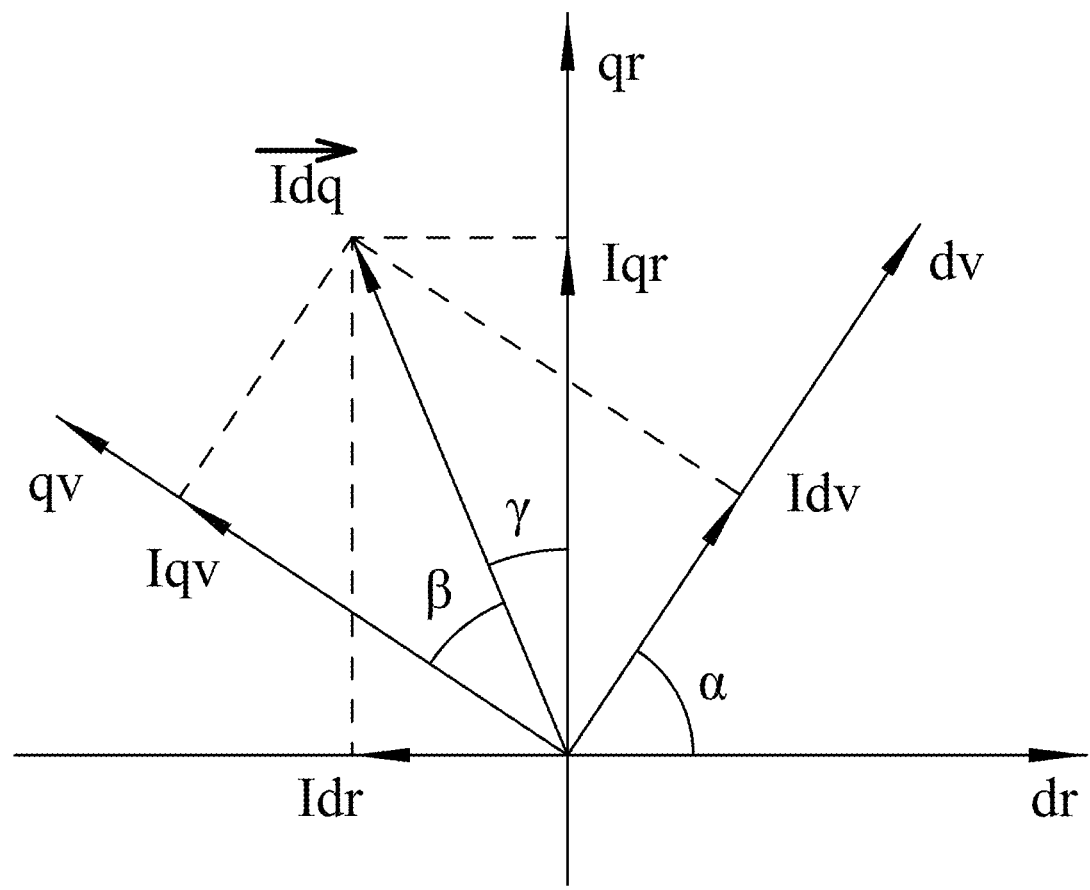
FIG. 14 shows the $d_r$-axis current value $I_{dr}$ and the $q_r$-axis current value $I_{qr}$ in a ($d_r$, $q_r$) rotor reference frame and the $d_v$-axis current value $I_{dv}$ and the $q_v$-axis current value $I_{qv}$ in a ($d_v$, $q_v$) voltage reference frame for the current vector $\vec{Idq}$ in accordance with one embodiment of the invention.
Figure 15:
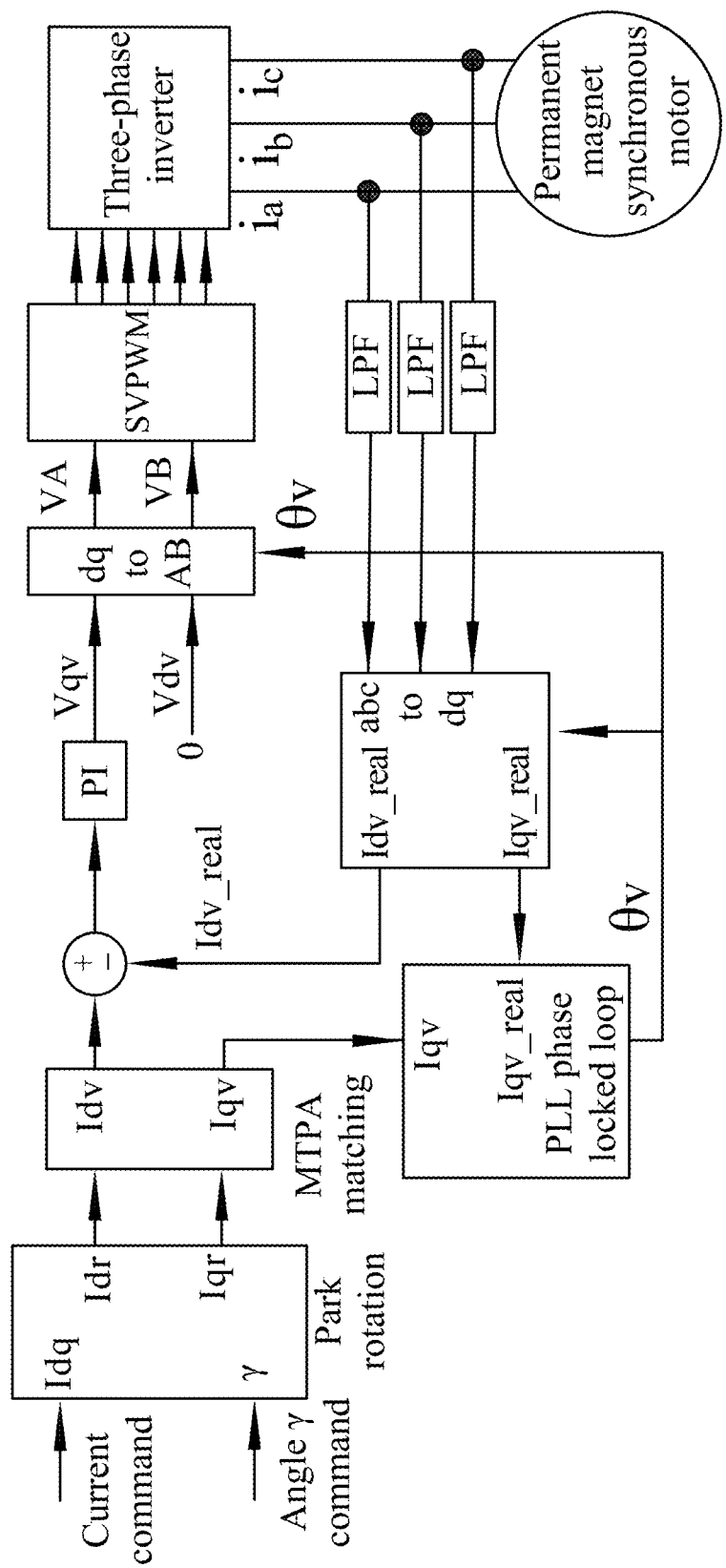
FIG. 15 is a block diagram of the method under the current-control mode, in accordance with one embodiment of the invention.

Referring to FIGS. 14 and 15, in one example of the invention, the method is performed under a current-control mode, a ($d_v$, $q_v$) voltage reference frame in which the voltage vector is aligned with the $q_v$-axis of the frame (i.e., $V_{dv}=0$ and $V_{qv}=V_{dq}$), is used to parse the orthogonal sinusoidal currents $I_A$ and $I_B$ of the real-time current vector $\overrightarrow{Iabc}$. The $q_v$-axis projection $I_{qv\_real}$ of the real-time current vector $\overrightarrow{Iabc}$ and the $q_v$-axis projection $I_{qv}$ of the target current vector $\overrightarrow{Idq}$ in the ($d_v$, $q_v$) voltage reference frame are processed with the phase lock loop (PLL) to obtain the voltage angle θv of the target voltage vector $\overrightarrow{Vdq}$. And the $d_v$-axis projection $I_{dv\_real}$ of the real-time current vector $\overrightarrow{Iabc}$ and the $d_v$-axis projection $I_{dv}$ of the target current vector $\overrightarrow{Idq}$ in the ($d_v$, $q_v$) voltage reference frame are processed with the PI controller to obtain the voltage value $V_{dq}$ of the target voltage vector $\vec{V}dq$. Then, the DC quantities $V_{dv}$ and $V_{qv}$ of the target voltage vector $\vec{V}dq$ in the $(d_v, q_v)$ voltage reference frame are converted into the sinusoidal quantities $V_A$ and $V_B$ in the orthogonal (A, B) stationary reference frame by performing a dq to AB transformation (i.e., a transformation from a (d, q) rotating reference frame to an orthogonal (A, B) stationary reference frame) through the inverse Park transmission by using the voltage value $V_{dq}$ and the voltage angle θ. Finally, the sinusoidal voltages $V_A$ and $V_B$ are converted to the phase voltage values $V_a$, $V_b$, and $V_c$ for modulating PWM signals of the inverter so as to regulate the real-time phase currents $I_a$, $I_b$, and $I_c$.

Figure 16:
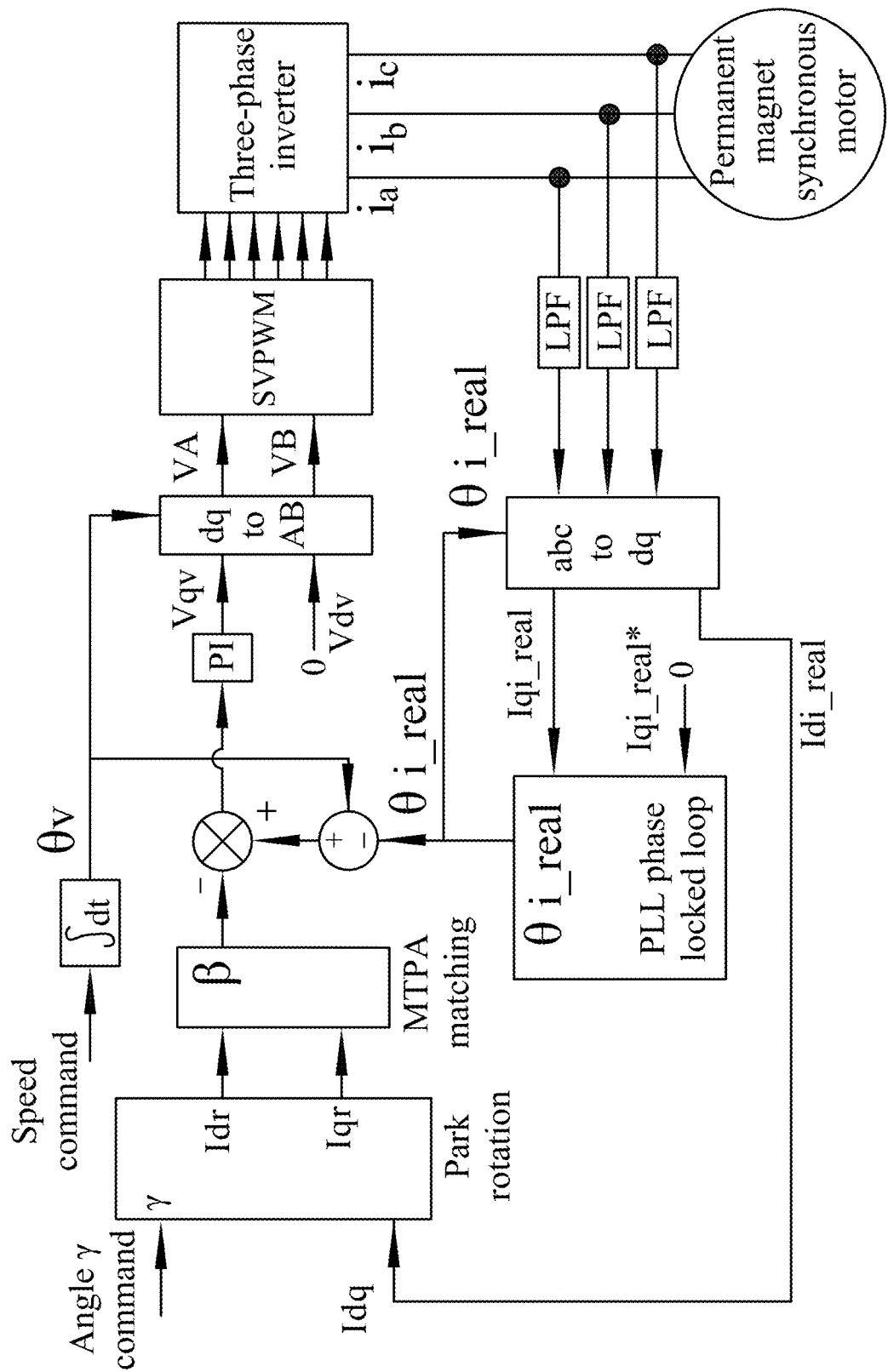
FIG. 16 is a block diagram of the method under the speed-control mode, in accordance with one embodiment of the invention.

Referring to FIGS. 14 and 16, in another example of the invention, the method is performed under a speed-control mode, which makes the voltage vector rotate at a given speed $S_{pd}$ to form an open-loop control. The voltage angle θv of the voltage vector $\vec{V}dq$ is obtained by: θv=∫$s_{pd}$× (pole_pair×360×Δt÷60)·dt, in which Spd is the speed value, pole_pair is the number of the magnetic rotor poles, and Δt is the time variable. The phase lock loop (PLL) coincides the (real-time or target) current vector $\vec{I}dq$ with the $d_i$-axis of a $(d_i, q_i)$ current reference frame (i.e., $I_{qi}=0$ and $I_{di}=I_{dq}$) to generate the current angle θi of current vector $\vec{I}dq$; then the angle difference θiv is obtained according to θiv=θv−θi and the voltage value $V_{dq}$ of the target current vector $\vec{V}dq$ is obtained according to $V_{dq}$=PI (θiv−β); and the DC quantities $(V_{dv}=0$, and $V_{qv}=V_{dq})$ in the $(d_v, q_v)$ voltage reference frame are converted to the sinusoidal quantities voltage values $V_A$ and $V_B$ in the orthogonal (A, B) stationary reference frame by using the voltage angle $θ_v$ and the voltage value $V_{dq}$.

The PI controller of the two control modes in the method of this invention regulates an angle error or a current error to produce the voltage value $V_{dq}$ through $V_{dq}$=PI (Δ); in the speed-control mode, Δ=$θ_{iv}$−β; and in the current control mode, Δ=$I_{dv}$−$I_{dv\_real}$. The phase current values Va, Vb, and Vc are derived from the voltage angle $θ_v$ and the voltage value $V_{dq}$, and the voltage angle $θ_v$ and the voltage value $V_{dq}$ are calculated by different means in these two control modes.

A static full-load start-up process of the motor with the PLSL-MTPA control of the invention includes: the motor is started with the maximum current value $I_{dq\_max}$ and is in a resistive state when the speed is low, the current vector and the voltage vector are in the same phase, and the PI controller tends to be operated at the maximum current value $I_{dq\_Max}$ to drive the motor. Then the back electromotive force (BEMF) increases with the increasing rotational speed, causing the phase difference β between the voltage vector $\vec{V}dq$ and the current vector $\vec{I}dq$ to gradually become non-zero, such that the PI controller is operated in a normal condition. The phase difference β between the voltage vector $\vec{V}dq$ and the current vector $\vec{I}dq$ varies with the actual load, and the motor currents change accordingly. The start-up ability of the motor depends on the target speed, the speed increasing slope, current PI gain, and the maximum current limit.

The conventional FOC method is typically carried out through a rotor reference frame, and a position-sensorless algorithm is used to derive the rotor position for performing the FOC method. Compared with the conventional FOC method, the PLSL-MTPA control method of the invention is not dependent on the motor parameters, it employs an angle conversion scheme and regulates phase difference between the current vector and the voltage vector, for realizing the synchronous control of the motor. The PLSL-MTPA scheme of the invention greatly simplifies the processes of a sensorless control of a motor.

The PLSL-MTPA control method of the disclosure employs the following four control schemes:
1) Under synchronous operation conditions, an adjustable angle β between the current vector and the voltage vector is unchanged, ensuring the comprehensive control of the synchronous motor, in which the angle β is also commonly referred to as the power factor angle;
2) Under synchronous operation conditions, the rotor position of a synchronous motor is derivable by using the voltage vector and the adjustable angle α, in which the angle α may lead or lag the voltage vector. For a given angle α, a control of a synchronous motor is fulfilled by applying a voltage vector to the motor;
3) a control under the maximum torque per current (MTPA) mode is carried out by converting the target current into the angles α and β, and the two angles α and β are determined according to the MTPA principle to be used the schemes in 1) and 2);
4) only when the target current is controlled along the MTPA trajectory and is converted to the angles α and β under the MTPA criterion, the rotor position derived through the scheme in 2) is the actual rotor position of the motor, and the torque generated by the motor is called MTPA torque; and
5) When the motor runs at a small current, the ratio of voltage to speed can be approximated as back electromotive force (BEMF). The operating conditions of a synchronous motor can be determined by comparing the ratio with a threshold.

The PLSL-MTPA method under the speed-control mode of the invention is an open-loop speed control that can be carried out under a load and through the field-weakening area. The speed and the position of the rotor only change with control commands, so that the control method is simple and optimizable and has a wide range of applications on electric machinery and electric drives.

The MTPA look-up table, also known as MTPA_Angle_Lookup, is mainly used to look up the angles α and β angle in FIG. 13. The relationship between the angles α and β and the MTPA look-up table is as follows:

$$\begin{pmatrix} \alpha \\ \beta \end{pmatrix} = \text{MTPA\_Angle\_Lookup} \ (I_{dr}, I_{qr}).$$

The angles α and β angle are determined by looking up the MTPA look-up table by referring the current $I_{dr}$ and the current $I_{qr}$.

The MTPA look-up table is a data set obtained from experiments. For example, a motor of 1/3 HP is used for experiments and its power is measured a dynamometer. A test for determining the included angle γ includes the steps of: the rotational speed of the motor is set at 1450 rpm, and the torque interval of the dynamometer is set at 10, 15, 20, 26, 31 oz-in, respectively. A maximum system efficiency or a maximum MTPA Index is searched under each torque range of the dynamometer, the corresponding current values $I_{dr}$, $I_{qr}$ and the angles α, β, and γ are recorded. Next, the test results are subjected to verification, five sets of data are obtained under the rotational speed of 1450 rpm, the set of data that allows for the maximum torque is selected and written to the MTPA look-up table. As shown in Table 1, the set of data including the angle γ, the current $I_{dr}$, the current $I_{qr}$, the angle α, and the angle β that allows for the maximum torque 31.64 are selected and written to the MTPA look-up table as the data correspondence at rotational speed of 1450 rpm. Similarly, the data set of the angle γ, the current $I_{dr}$, the current $I_{qr}$, the angle α, and the angle β that allows for the maximum torque is determined for a different rotational speed of 1400 rpm, 1350 rpm, 1300 rpm, etc., and written to the MTPA look-up table. The data in Table 1 are obtained in the speed control mode.

TABLE 1

| $S_{dq}$ | Torque | γ | $I_{dr}$ | $I_{qr}$ | α | β |
|---|---|---|---|---|---|---|
| 1450 rpm | 10.46 | 1728 | 500 | 1652 | 3391 | 13356 |
| 1450 rpm | 15.98 | 2640 | 1240 | 2344 | 6592 | 11308 |
| 1450 rpm | 20.94 | 3500 | 1900 | 2964 | 8640 | 10456 |
| 1450 rpm | 26.46 | 4483 | 2608 | 3672 | 10177 | 9988 |
| 1450 rpm | 31.64 | 5498 | 3356 | 4388 | 11328 | 9604 |

For the current control mode, the MTPA look-up table is obtained in a similar way from experiments. For example, a motor of 1/3 HP is used for experiments and its power is measured a dynamometer. A test for determining the included angle γ includes the steps of: the current value $I_{dq}$ flowing through the motor is set to 3.2A, and the torque interval of the dynamometer is set at 12, 18, 24, 28, 33 oz-in, respectively. A maximum system efficiency or a maximum MTPA_Index is searched under each torque range of the dynamometer, and the corresponding current values $I_{dr}$, $I_{qr}$ and the angles α, β, and γ are recorded. The test results are subjected to verification for the current value $I_{dq}$ that defaults to 3.2 A, five sets of data are obtained under the current value $I_{dq}$ of 3.2 A, the set of data as shown in FIG. 2 that allows for the maximum torque is selected and written to the MTPA look-up table.

TABLE 2

| $I_{dq}$ | Torque | γ | $I_{dr}$ | $I_{qr}$ | α | β |
|---|---|---|---|---|---|---|
| 3.2 A | 12 | 1455 | 650 | 2253 | 2351 | 13450 |
| 3.2 A | 18 | 2228 | 1440 | 2698 | 4323 | 12011 |
| 3.2 A | 24 | 3400 | 1800 | 3298 | 6543 | 10244 |
| 3.2 A | 28 | 4578 | 2708 | 3789 | 8678 | 951 |
| 3.2 A | 33 | 5677 | 3676 | 4565 | 10233 | 8867 |

Figure 17:
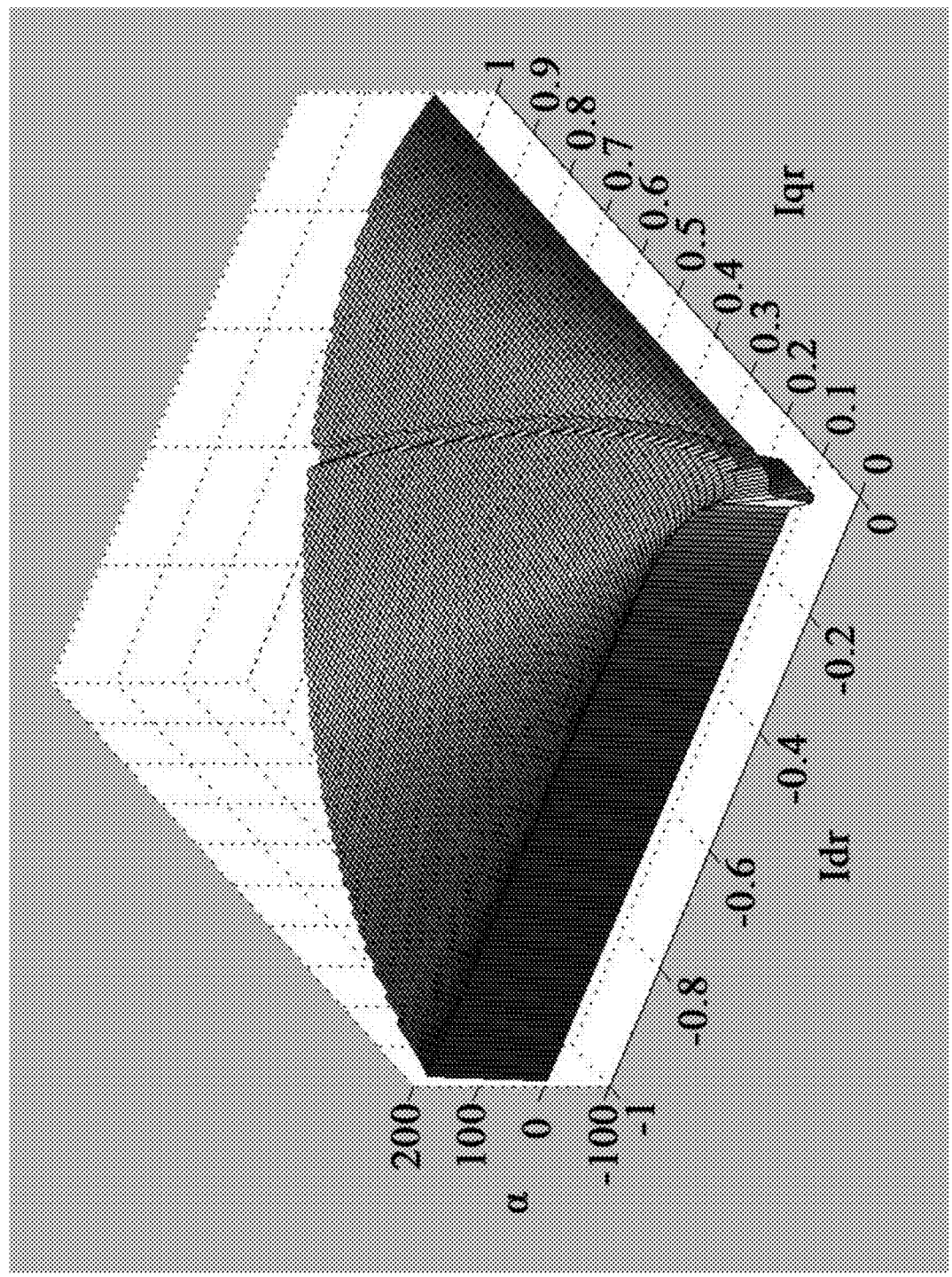
FIG. 17 is a correlation between the voltage-rotor angle α, the $d_r$-axis current value $I_{dr}$, and the $q_r$-axis current value $I_{qr}$, in accordance with one embodiment of the invention.
Figure 18:
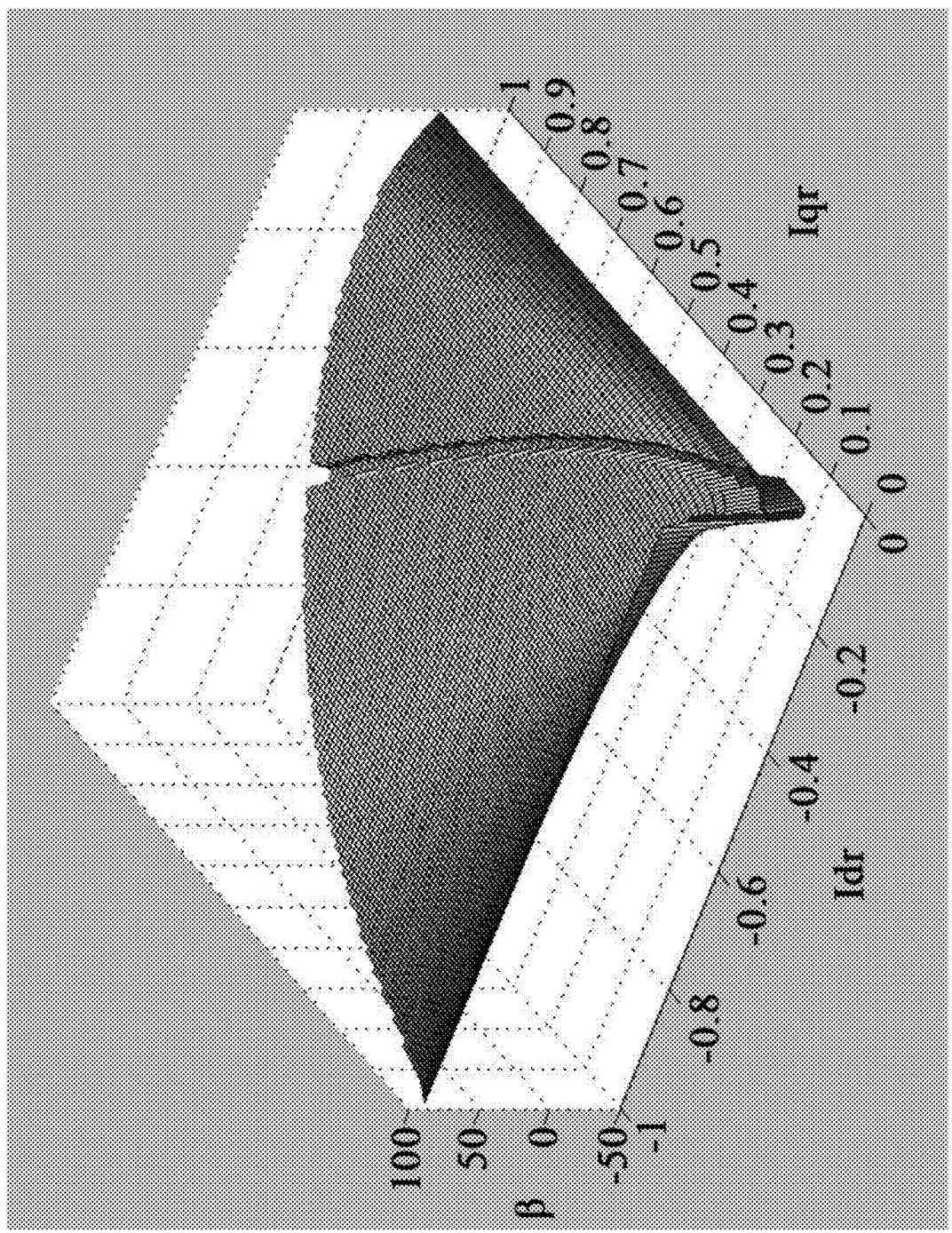
FIG. 18 is a correlation between the voltage-current angle β, the $d_r$-axis current value $I_{dr}$, and the $q_r$-axis current value $I_{qr}$, in accordance with one embodiment of the invention.

The MTPA look-up table can also be obtained from computer-aided finite element analysis software. As shown in FIGS. 17 and 18, the relevant data is obtained by computer-aided finite element analysis, and, the angles α or β are obtained under various current $I_{dr}$ and current $I_{qr}$. The MTPA look-up table can also be obtained from theoretical calculations.

The control method derives the rotor position without using a magnetic flux observer, thus requiring less CPU time to do the calculation, and being more intuitive and simpler to the position-sensorless control of the motor. The current control mode and the speed control mode of the motor are operated by two decoupled PI-controllers, achieving better control stability and dynamic response than the multi-stage nested control circuits. In the current control mode and the speed control mode of the disclosure, the control method regulates the current to flow along the MTPA trajectory that can be calibrated. The motor is fully functional and allows for starting up with a full load, over the full operating range from BEMF-free to field-weakening control. The PLSL-MTPA mathematical model of the disclosure does not reply on a single rotor reference frame, it converts the current vector of the motor to a current reference frame and a voltage reference frame, thus parsing the included angle of the vectors to perform the position-sensorless control. The mathematical models, the relative algorithms, and the calculations in the method are simple, and thus the method requires less space on the chips and low requirement for MCU and makes the motor more costly to control. The PLSL-MTPA mathematical model used in the disclosure is an optimized position-sensorless control technology that is not dependent on the motor parameters. The technology solves the bottleneck problem that the position-sensorless control of the motor is highly dependent on the motor parameters such as the resistance Rs, the d-axis inductance Ld, the q-axis inductance Lq, and the magnetic flux λm, such that the mathematical model has a relative wider range of applications.

Comparison of the field-weakening control method of the disclosure and that of the conventional FOC control theory:

The principle of the field-weakening control method of the conventional FOC control theory is that the control process of a permanent magnet synchronous motors is typically performed in two areas including MTPA area and a field weakening area. As the speed of the motor increases, there may be a maximum torque area or a maximum current area outside the field weakening area, but the two maximum areas are rarely used in practice. The FOC control method of the motor is a method to regulate the current values Id and Iq, that is, a control method with two degrees of freedom. The MTPA control is a theory that controls the two current values Id and Iq to keep a motor in optimized operational condition. When the current enters the field-weakening area, the freedom in the Id direction is locked, and only the current value Iq is proportional to the output torque, so that the motor may no longer be optimized. The relationship between the current value Id and field weakening is: since a permanent magnet is embedded in the rotor, the rotor magnetic field induces a back electromotive force (BEMF) that is offset by the stator voltage when the motor is rotating, the back electromotive force (BEMF) is proportional to the speed. Once the rotational speed exceeds a threshold, the BEMF will also exceed the stator voltage, causing the motor to fail to operate satisfactorily in the electric state. The so-called field-weakening control is a method to increase the current value Id in the negative direction when the back electromotive force (BEMF) exceeds a threshold, thereby generating a magnetic field to specifically weaken the rotor magnetic field. The current value Id depends on the rotational speed and the motor load, but the ultimate goal is to make the back electromotive force (BEMF) less than the maximum stator voltage.

In the classic field-weakening control theory, the following motor electromagnetic equations are used, in which $V_d$ is a d-axis voltage of the voltage vector; $V_q$ is the q-axis voltage; $I_d$ is the d-axis current of the current vector; $I_q$ is the q-axis current; r is the motor resistance; O)r is the angular speed of the rotor; $λ_d$ is the d-axis flux linkage; $λ_q$ is the q-axis flux linkage; $λ_{pm}$ is the permanent magnetic flux linkage; $L_d$ is the d-axis inductance; and $L_q$ is the q-axis inductance; the quantities $V_d$, $V_q$, $I_d$, $I_q$, $λ_d$, $λ_q$, $L_d$, and $L_q$ are components in a (d, q) rotating reference frame.

$$V_d = rI_d - \omega_r \lambda_q = rI_d - \omega_r L_q I_q;$$

$$V_q = rI_q + \omega_r \lambda_d = rI_q + \omega_r (L_d I_d + \lambda_{pn}).$$

Because the motor resistance r is very small, the components $rI_d$ and $rI_q$ are negligible in the above electromagnetic equations. And due to the voltage limitation, the current values $I_d$ and $I_q$ satisfy the following elliptic equation:

$$\left(\frac{V_0}{\omega_r L_q}\right)^2 = I_q^2 + \left(\frac{L_d}{L_q}\right)^2 \left(I_d + \frac{\lambda_{pm}}{L_d}\right)^2.$$

Under the field-weakening condition with $$V_0 = \frac{2V_{DC}}{\pi},$$

and the single solution of the current value $I_q$ is obtained by the following formula, and the current value $I_q$ can be calculated according to the known current $I_d$ $$I_q = \sqrt{\left(\frac{V_0}{\omega_r L_q}\right)^2 - \left(\frac{L_d}{L_q}\right)^2 \left(I_d + \frac{\lambda_{pm}}{L_d}\right)^2}.$$

It can be seen from the actual test simulated result that, the currents $I_d$ and $I_q$ can flow along the MTPA trajectory at low speed, and satisfy the voltage-ellipse limit at high speed. The solution of the current value $I_d$ is given by the control logic (such as a PI controller, a look-up table and so on) instead of a given formula. In summary, the key to the field-weakening control is to find the current value $I_d$ that ensures the voltage does not exceed the preset threshold, and then the current value $I_q$ is calculated by using the $I_d$, thus achieving the current control of a motor under the FOC theory.

The control method of the disclosure, also known as the PLPS-MTPA control method, has different control means in the field-weakening control compared to the conventional FOC control. The field-weakening control method of the invention directly regulates the voltage instead of finding the current value $I_d$ in the conventional method. The voltage value $V_{dq}$ ($V_{dq}=Vq$, $Vd=0$) is limited below the DC bus voltage $V_{dc\_bus}$, the resulting current value Id is completely snubbed by the inverter, and the phase angle of the current and voltage vectors are regulated to generate the required torque. The control strategy in the invention completely meets the field-weakening theory, its implementation process is greatly simplified, and it allows for a more reliable control of the motor.

EXAMPLE 1

As shown in FIGS. 14 and 15, the PLSL-MTPA control method of the disclosure is carried out under a current-control mode as follows:

a), a target current value $I_{dq}$ and a preset current-rotor angle γ are input by a user; second, the target dr-axis current value $I_{dr}$ and $q_r$-axis current value $I_{qr}$ are calculated by projecting target current value $I_{dq}$ onto the $d_r$-axis and the $q_r$-axis of the ($d_r$, $q_r$) rotor reference frame; the target current value $I_{dq}$ and a preset current-rotor angle γ are data conforming to the MTPA mode.

b), a target voltage-rotor angle a is looked up by using a MTPA look-up table according to the target $d_r$-axis current value $I_{dr}$ and $q_r$-axis current value $I_{qr}$, in which the angle α is an included angle between the ($d_r$, $q_r$) rotor reference frame and the ($d_v$, $q_v$) voltage reference frame, the MTPA look-up table refers to a set of data obtained in the maximum torque per ampere (MTPA) mode.

c), the target $d_v$-axis current value $I_{dv}$ and the target qv-axis current value $I_{qv}$ of the target current vector $\overrightarrow{Idq}$ are calculated by using the angle α, the $d_r$-axis current value $I_{dr}$, and the $q_r$-axis current value $I_{qr}$, in which the $d_v$-axis current value $i_{dv}$ and the $q_v$-axis current value $I_{qv}$ are obtained by projecting the target current value $I_{dq}$ onto the ($d_v$, $q_v$) voltage reference frame;

d), the target $q_v$-axis current value $I_{qv}$ and the feedback $q_v$-axis current value $I_{qv\_real}$ reflecting the operating conditions of the rotor in real time are inputted to a phase lock loop (PLL) to obtain the target voltage angle $θ_v$; target $d_v$-axis current value $I_{dv}$ and the feedback dv-axis current value $I_{dv\_real}$ are regulated with a PI controller to obtain the target voltage value $V_{qv}$. Because $V_{dv}=0$ and $V_{dq}=V_{qv}$, the voltage $V_A$ and the voltage $V_B$ in the orthogonal (A, B) stationary reference frame are calculated according to the angle $θ_v$ and the target voltage value $V_{dq}$, and are used for controlling the phase currents of the motor.

The following formulas are used to calculate the $d_v$-axis current $I_{dv}$ and the $q_v$-axis current $I_{qv}$:

$I_{dv}=I_{dr}*\cos(α)+I_{qr}*\sin(α)$, and $I_{qv}=-I_{dr}*\sin(α)+I_{qr}*\cos(α)$.

The following formulas are used to calculate the $d_r$-axis current value $I_{dr}$ and the $q_r$-axis current value $I_{qr}$:

$I_{dr}=-I_{dq}×\sin(γ)$, and $I_{qr}=I_{dq}×\cos(γ)$.

In the current control mode, when the target current value Vdq (i.e., the $q_v$-axis voltage value $V_{qv}$) is larger than or equal to the preset threshold Vmax, the PI controller is operated at a saturated state, the output voltage of the controller is limited to the preset threshold Vmax, and the $d_v$-axis current value $I_{dv}$ cannot be used for control. Such condition is termed as a "field-weakening control."

The MTPA look-up table is a data set obtained from experiments, theoretical calculations, or computer-aided finite element analysis softwares.

EXAMPLE 2

As shown in FIGS. 14 and 16, the PLSL-MTPA control method of the disclosure is carried out under a current-control mode as follows:

a), a given speed Spd and a preset angle γ are inputted by a user, and the vector angle of the voltage vector $\overrightarrow{Vdq}$ is rotated at the given speed Spd to determine the angle $θ_v$, where the angle $θ_v$ is an included angle between the voltage vector Vdq and the A-axis the (A, B) stationary coordinate system;

b), a ($d_i$, $q_i$) current reference frame is used and the real-time current vector $\overrightarrow{Iabc}$ is aligned with the $d_i$-axis of the ($d_i$, $q_i$) current reference frame, such that the $q_i$-axis current value $θ_{i\_real}$ in the frame is 0. A phase lock loop (PLL) is used to decode the current angle $θ_{i\_real}$ for the real-time current vector $\overrightarrow{Iabc}$. The $d_i$-axis current value $I_{di\_real}$ is calculated and used as the target current value $I_{dq}$.

c), the target $d_r$-axis current value $I_{dr}$ and the target qi-axis current value $I_{qr}$ are calculated by using the angle γ and the target current value $I_{dq}$, in which the target $d_r$-axis current value $I_{dr}$ and the target $q_r$-axis current value $I_{qr}$ are obtained by converting the target current value $I_{dq}$ to the $(d_r, q_r)$ rotor reference frame, and the current values $I_{dr}$ and $I_{qr}$ are data conforming to the MTPA mode.

d), an target voltage-current β is determined by using the MTPA look-up table with reference to the current values $I_{dr}$ and $I_{qr}$, in which the angle β is an included angle between the voltage vector $\overrightarrow{Vdq}$ and the current vector $\overrightarrow{Idq}$ in the MTPA mode; and e) an angle difference θiv between the target voltage angle $θ_v$ and the current angle $θ_{i\_real}$ for the feedback real-time current vector Iabc is calculated according to $θ_{iv}=θ_v-θ_{i\_real}$. The target angle β and the angle difference θiv are regulated with the PI controller to obtain a target voltage value $V_{dq}$. Because $V_{dv}=0$ and $V_{dq}=V_{qv}$, the voltage $V_A$ and the voltage $V_B$ in the orthogonal (A, B) stationary reference frame are calculated according to the angle $θ_v$ and the target voltage value $V_{dq}$, and are used for controlling the phase currents of the motor.

The MTPA look-up table is a data set obtained from experiments, theoretical calculations, or computer-aided finite element analysis softwares.

In the feedback $q_i$-axis current $I_{qi\_real}$ reflecting the operating condition of the motor in real time is inputted to the phase lock loop (PLL), and another input current Iq* defaults to zero, in which the feedback $q_i$-axis current $I_{qi\_real}$ is a projection of the real-time current vector $\overrightarrow{Iabc}$ onto the $q_i$-axis of the $(d_i, q_i)$ current reference frame. Then the phase lock loop (PLL) outputs the angle $θ_{i\_real}$ that is generated by parsing the currents $I_A$ and the $I_B$ with the phase lock loop (PLL) by fulfilling $I_{qi\_real}=0$.

The following formula is used to calculate the angle $θ_v$:

$$θv=∫s_{pd}×(pole\_pair×360×αt+60)·dt,$$

in which Spd is the speed value, pole_pair is the number of the magnetic rotor poles, and Δt is the time variable.

In the speed control mode, when the target current value Vdq (i.e., the $q_v$-axis voltage value $V_{qv}$) is larger than or equal to the preset threshold Vmax, the PI controller is operated at a saturated state and the output voltage of the controller is limited to the preset threshold Vmax, and thus the current control mode is automatically converted to the filed-weakening control mode.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A maximum-torque-per-ampere (MTPA) based control method for a parameterless and position-sensorless control of a permanent magnet synchronous motor, the method comprising:

1) calculating a target $d_r$-axis current value $I_{dr}$ and a target $q_r$-axis current value $I_{qr}$ of a target current vector $\overrightarrow{Idq}$ in a $(d_r, q_r)$ rotor reference frame by using a target current value $I_{dq}$ of the target current vector $\overrightarrow{Idq}$ and a preset current-rotor angle γ; wherein the preset current-rotor angle γ is an angle between the target current vector $\overrightarrow{Idq}$ and the $q_r$-axis of the $(d_r, q_r)$ rotor reference frame; the $(d_r, q_r)$ rotor reference frame is a first (d, q) rotating reference frame that is rotating in synchronism with the rotating magnetic field, and the rotor position is aligned with the $d_r$-axis of the $(d_r, q_r)$ rotor reference frame; the target current value $I_{dq}$ is input by a user or obtained by using the real-time phase current values Ia, Ib, and Ic of a real-time current vector $\overrightarrow{Iabc}$; and the preset current-rotor angle γ is input by the user;

2) looking up a target voltage-rotor angle α or a target voltage-current angle β through a MTPA look-up table by referring to the target $d_r$-axis current value $I_{dr}$ and the target qr-axis current value $I_{qr}$; wherein the target voltage-rotor angle α is measured between the $d_v$-axis of α $(d_v, q_v)$ voltage reference frame and the $d_r$-axis of the $(d_r, q_r)$ rotor reference frame; the $(d_v, q_v)$ voltage reference frame is a second (d, q) rotating reference frame that is rotating in synchronism with the rotating magnetic field, and a target voltage vector $\overrightarrow{Vdq}$ is aligned with the $q_v$-axis of the $(d_v, q_v)$ voltage reference frame; the target voltage-current angle β is measured between the target voltage vector $\overrightarrow{Vdq}$ and the target current vector $\overrightarrow{Idq}$; and the MTPA look-up table is obtained in the MTPA mode and comprises correspondences between the target $d_r$-axis current value $I_{dr}$, the target $q_r$-axis current value $I_{qr}$, the preset current-rotor angle γ, the target voltage-rotor angle α, and the target voltage-current angle β;

3) calculating a PI error Δ by using the target dr-axis current value $I_{dr}$, the target qr-axis current value $I_{qr}$, the target voltage-rotor angle α, the target voltage-current angle β, and the real-time phase current values $I_a$, $I_b$, and $I_c$; and obtaining a target voltage value $V_{dq}$ of the target voltage vector $\overrightarrow{Vdq}$ by regulating the PI error Δ through a PI controller;

4) obtaining a target voltage angle $θ_v$ of the target voltage vector $\overrightarrow{Vdq}$, wherein the target voltage angle $θ_v$ is measured between the target voltage vector $\overrightarrow{Vdq}$ and the A-axis of the orthogonal (A, B) stationary reference frame; the target voltage angle $θ_v$ is obtained by using the target dr-axis current value $I_{dr}$, the target $q_r$-axis current value $I_{qr}$, the target voltage-rotor angle α, and the real-time phase current values $I_a$, $I_b$, and $I_c$, or obtained by using a given rotating speed value $S_{pd}$ of the rotor; and 5) calculating a target A-axis voltage value $V_A$ and a target B-axis voltage value $V_B$ in the orthogonal (A, B) stationary reference frame by using the target voltage value $V_{dq}$ and the target voltage angle $θ_v$ through the inverse Park transmission, converting the target A-axis voltage $V_A$ and the target B-axis voltage $V_B$ into target phase voltage values $V_a$, $V_b$, and $V_c$, and modulating PWM signals of the inverter by using the target voltage values $V_a$, $V_b$, and $V_c$, for regulating the real-time phase current values $I_a$, $I_b$, and $I_c$.

2. The method of claim 1, the method is operated in a current-control mode, wherein:

in 1), the target current value $I_{dq}$ is input by the user; and the target dr-axis current value $I_{dr}$ and the target $q_r$-axis current value $I_{qr}$ are calculated via the formulas: $I_{dr}=-I_{dq}×\sin(γ)$, and $I_{qr}=I_{dq}×\cos(γ)$.

in 3), the PI error Δ equals to a target $d_v$-axis current value $I_{dv}$ of the target current vector $\overrightarrow{Idq}$ minus a $d_v$-axis current value $I_{dv\_real}$ of the real-time current vector $\overrightarrow{Iabc}$ in the $(d_v, q_v)$ voltage reference frame by using $Δ=I_{dv}-$ $I_{dv\_real}$; wherein the target $d_v$-axis current value $I_{dv}$ is calculated via the formula $I_{dv}=I_{dr}*\cos(\alpha)+I_{qr}*\sin(\alpha)$; the $d_v$-axis current value $I_{dv\_real}$ is obtained via the park transmission by using an A-axis current value $I_A$ and a B-axis current value Is of the real-time current vector $\overrightarrow{Iabc}$ in the orthogonal (A, B) stationary reference frame; the A-axis current value $I_A$ and the B-axis current value $I_B$ are converted by the real-time phase current values $I_a$, $I_b$, and $I_c$; and the $d_v$-axis current value $I_{dv\_real}$ is calculated by using the formula $I_{dv\_real}=I_A*\cos(\theta_{dv-qv})+I_B*\sin(\theta_{dv-qv})$, $\theta_{dv-qv}$ is the observation angle of the $(d_v, q_v)$ voltage reference frame, $\theta_{dv-qv}$ is measured between the $d_v$-axis of the $(d_v, q_v)$ voltage reference frame and the A-axis of the orthogonal (A, B) stationary reference frame, and $\theta_v=\theta_{dv-qv}+90°$; and in 4), the target voltage angle $\theta_v$ is obtained by inputting a target qv-axis current value $I_{qv}$ of the target current vector $\overrightarrow{Idq}$ and a $q_v$-axis current value $I_{qv\_real}$ of the real-time current vector $\overrightarrow{Iabc}$ in the $(d_v, q_v)$ voltage reference frame into a phase lock loop; wherein the target $q_v$-axis current value $I_{qv}$ is calculated via the formula $I_{qv}=-I_{dr}*\sin(\alpha)+I_{qr}*\cos(\alpha)$; the $q_v$-axis current value $I_{qv\_real}$ is calculated via the formula $I_{qv\_real}=I_B\cos(\theta_{dv-qv})-I_A*\sin(\theta_{dv-qv})$; and the phase lock loop decodes $\theta_v$ by fulfilling the formulas: $I_{qv}=I_{qv\_real}$ and $\theta_v=\theta_{dv-qv}+90°$.

3. The method of claim 1, the method is operated in a speed-control mode, wherein:

in 1), the target current value $I_{dq}$ is obtained via:

constructing a $(d_i, q_i)$ current reference frame, wherein the $(d_i, q_i)$ current reference frame is a third (d, q) rotating reference frame that is rotating in synchronism with the rotating magnetic field, and the real-time current vector $\overrightarrow{Iabc}$ is aligned with the $d_i$-axis of a $(d_i, q_i)$ current reference frame; whereby a current angle $\theta_{i\_real}$ of the real-time current vector $\overrightarrow{Iabc}$ is the same as the observation angle $\theta_{di-qi}$ for the $(d_i, q_i)$ current reference frame, and a $q_i$-axis current value $I_{qi\_real}$ of the real-time current vector $\overrightarrow{Iabc}$ is zero; the current angle $\theta_{i\_real}$ is an angle between the real-time current vector $\overrightarrow{Iabc}$ and the A-axis of the orthogonal (A, B) stationary reference frame, and the observation angle $\theta_{di-qi}$ is an angle between the $d_i$-axis of the $(d_i, q_i)$ current reference frame and the A-axis of the orthogonal (A, B) stationary reference frame;

2b) obtaining a $q_i$-axis current value $I_{qi\_real}$ of the real-time current vector $\overrightarrow{Iabc}$ in the $(d_i, q_i)$ current reference frame via the Park transmission by using the formula $I_{qi\_real}=I_B*\cos(\theta_{i\_real})-I_A*\sin(\theta_{i\_real})$; and obtaining the current angle $\theta_{i\_real}$ by inputting the $q_i$-axis current value $I_{qi\_real}$ and a zero into a phase lock loop, wherein the phase lock loop decodes $\theta_{i\_real}$ via the formula $I_B*\cos(\theta_{i\_real})-I_A*\sin(\theta_{i\_real})=0$;

1c) obtaining a $d_i$-axis current value $I_{di\_real}$ of the real-time current vector $\overrightarrow{Iabc}$ via the Park transmission by using the formula $I_{di\_real}=I_A*\cos(\theta_{i\_real})+I_B*\sin(\theta_{i\_real})$, and using the $d_i$-axis current value $I_{di\_real}$ as the target current value $I_{dq}$;

in 3), the PI error Δ equals to a real-time voltage-current angle $\theta_{i,v}$ minus the target voltage-current angle β; wherein real-time voltage-current angle $\theta_{i,v}$ equals to the target voltage angle $\theta_v$ minus the real-time current angle $\theta_{i\_real}$; and in 4), the target voltage angle $\theta_v$ is obtained by using the formula $\theta_v=\int s_{pd}\times(\text{pole\_pair}\times 360\times\Delta t\div 60)\cdot dt$; wherein Spd is a given rotating speed value that is input by the user, pole_pair is the number of the magnetic rotor poles, and Δt is the time variable.

4. The method of claim 1, the MTPA look-up table is obtained through experiments, theoretical calculations, or computer-aided finite-element-analysis software.

5. The method of claim 2, when the target voltage value $V_{dq}$ is larger than or equal to the preset threshold Vmax, the $d_v$-axis current value $I_{dv}$ of the target current vector $\overrightarrow{Idq}$ is not useful for control, and the method is a field-weakening control.

6. The method of claim 3, when the target voltage value $V_{dq}$ is larger than or equal to the preset threshold Vmax, the $d_v$-axis current value $I_{dv}$ of the target current vector $\overrightarrow{Idq}$ is not useful for control, and the method is a field-weakening control.

* * * * *